June 24, 1930. A. G. F. KUROWSKI ET AL 1,767,247
TYPEWRITING MACHINE FOR THE BLIND
Filed May 1, 1926    15 Sheets-Sheet 1

Inventors
Alfred G. F. Kurowski
and Charles W. Lawrence
by B. E. Hickney
Attorney

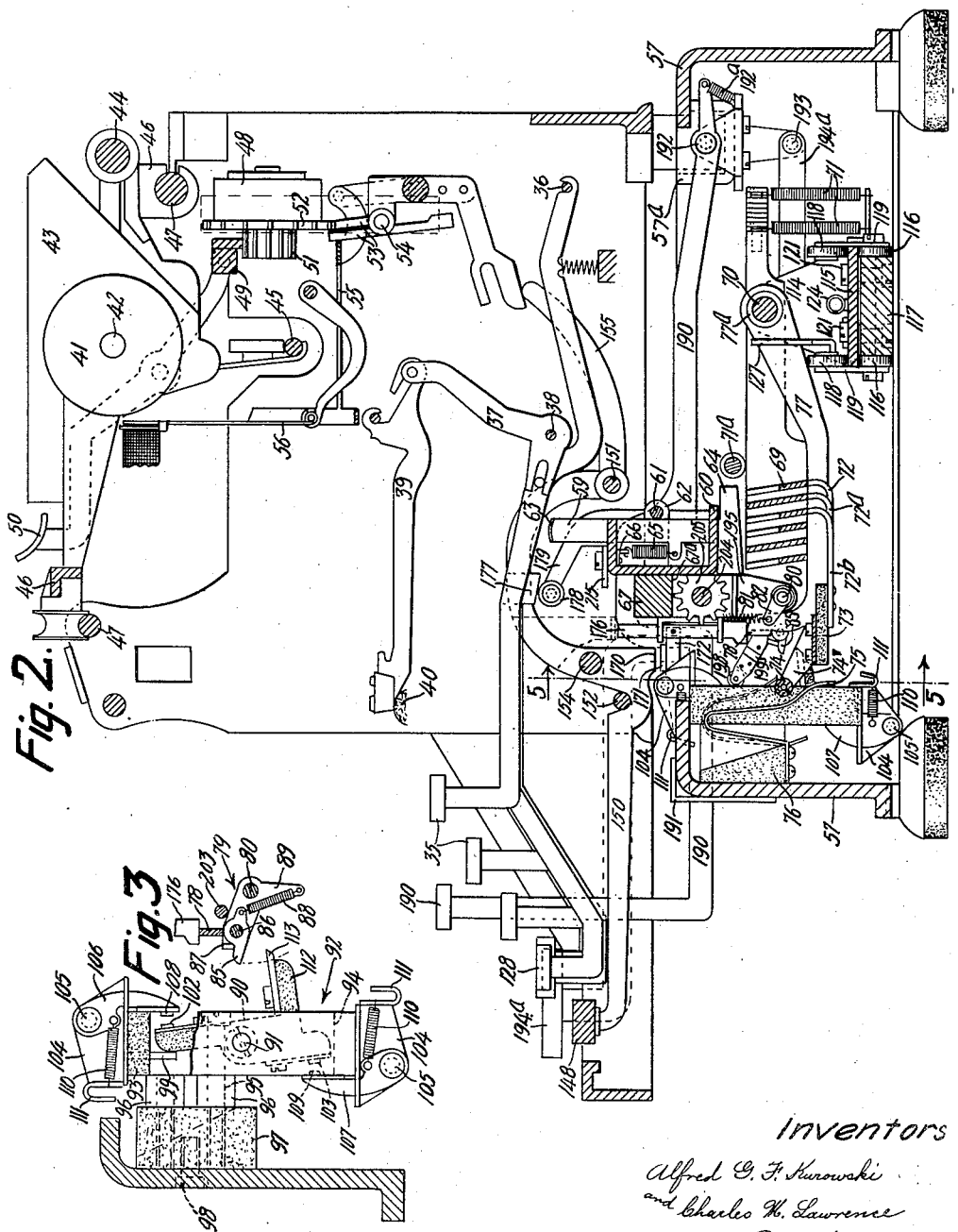

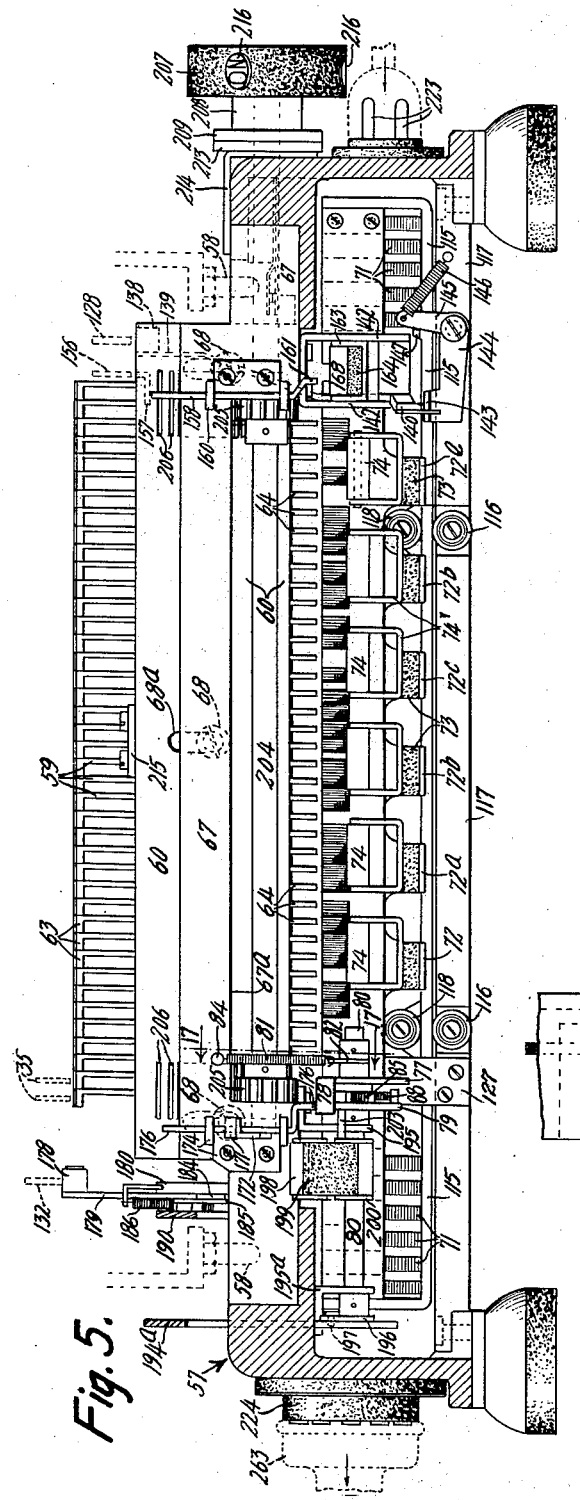
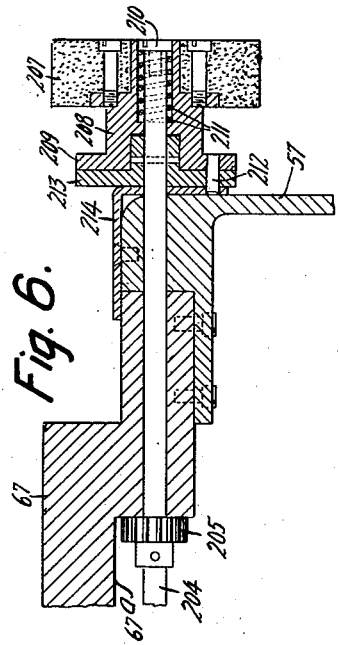
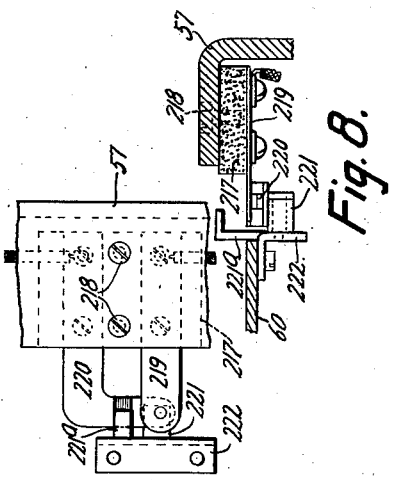

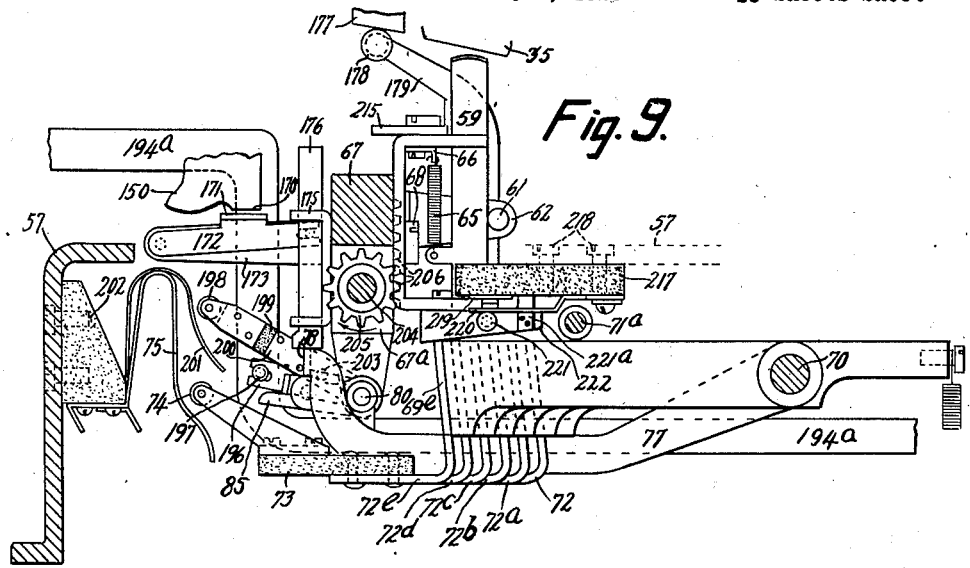

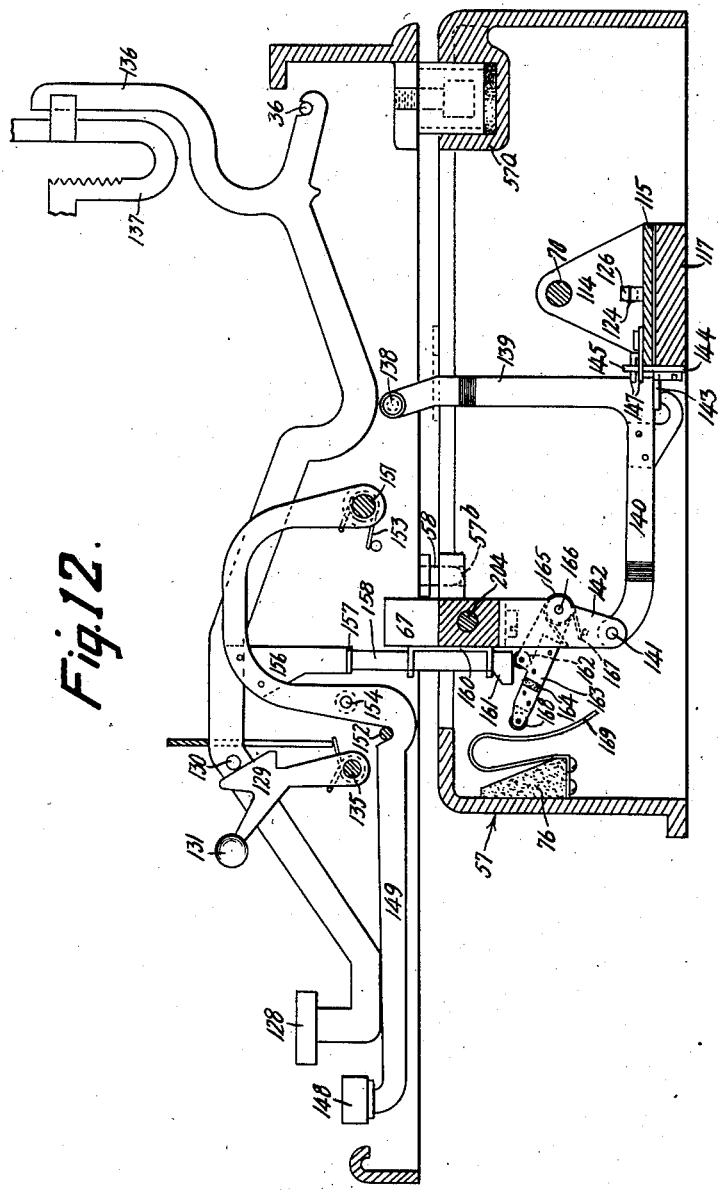

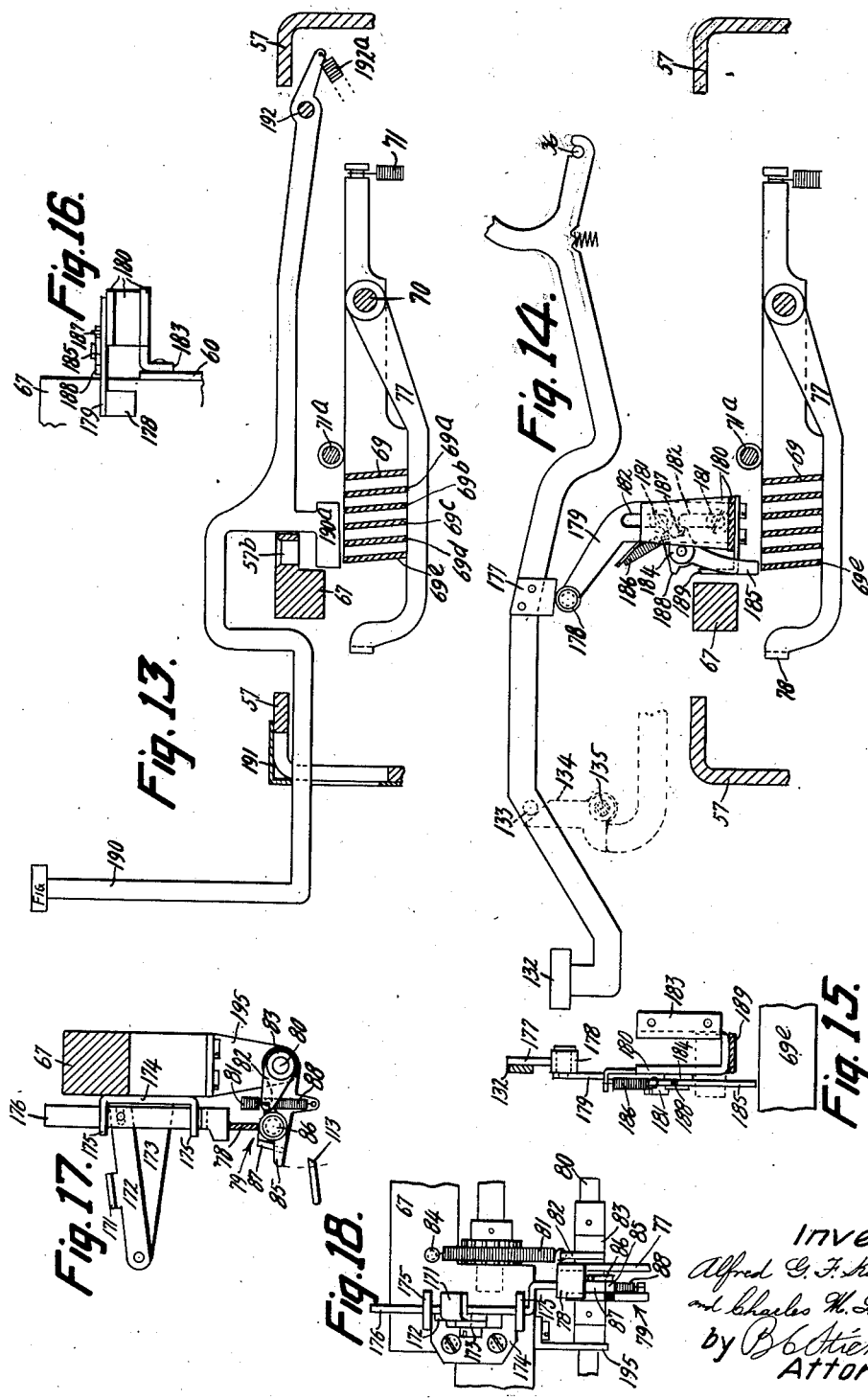

June 24, 1930.  A. G. F. KUROWSKI ET AL  1,767,247
TYPEWRITING MACHINE FOR THE BLIND
Filed May 1, 1926  15 Sheets-Sheet 8
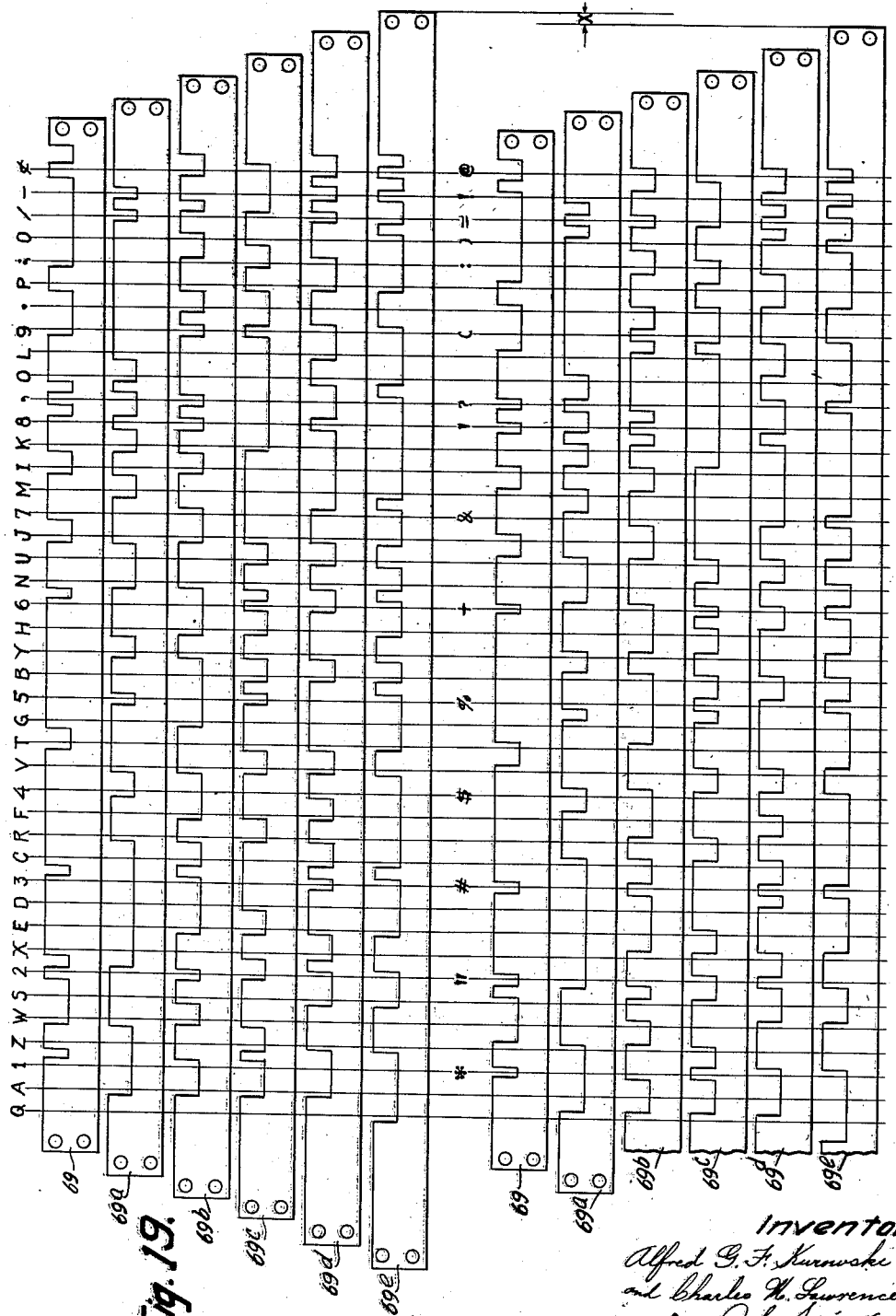

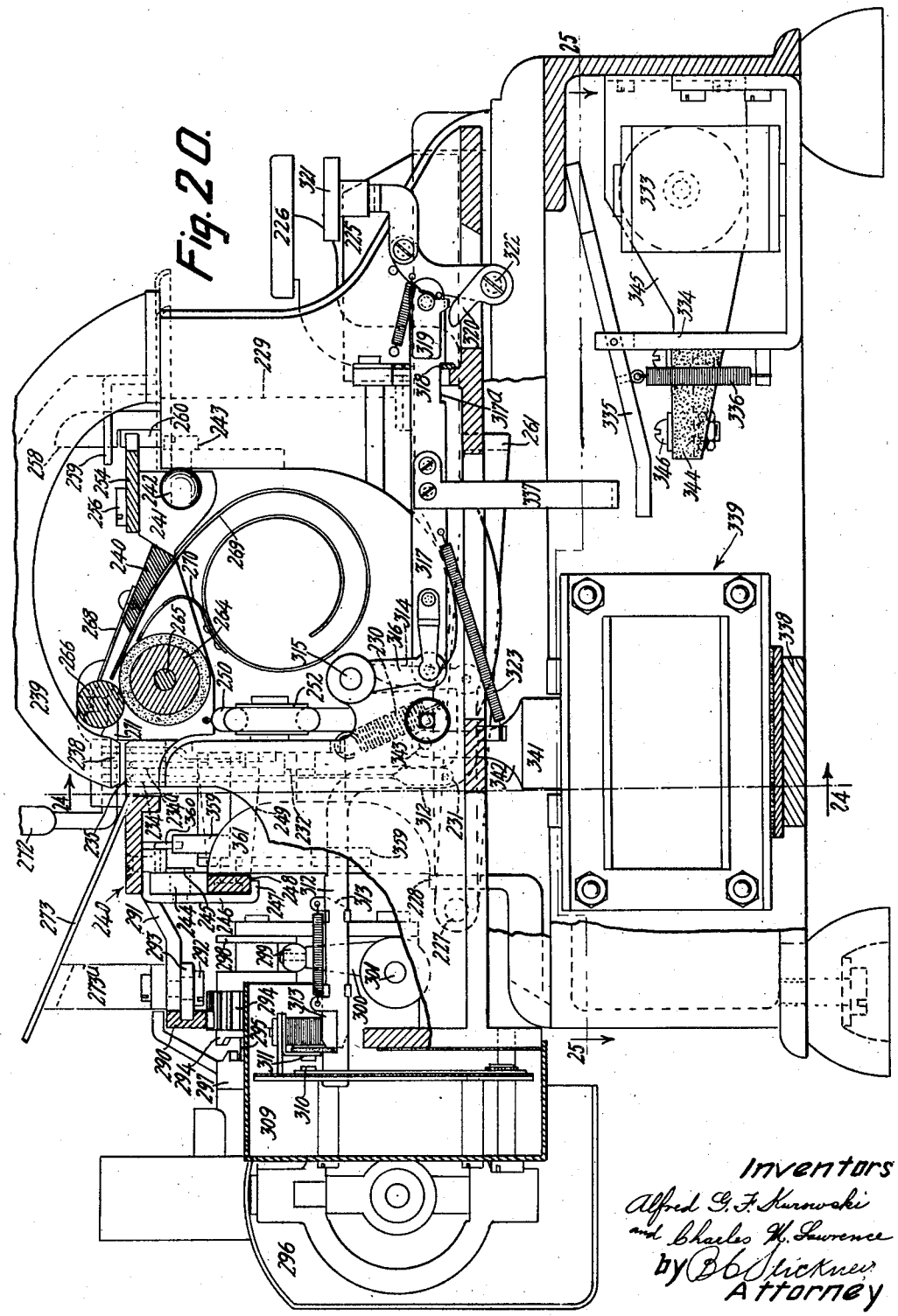

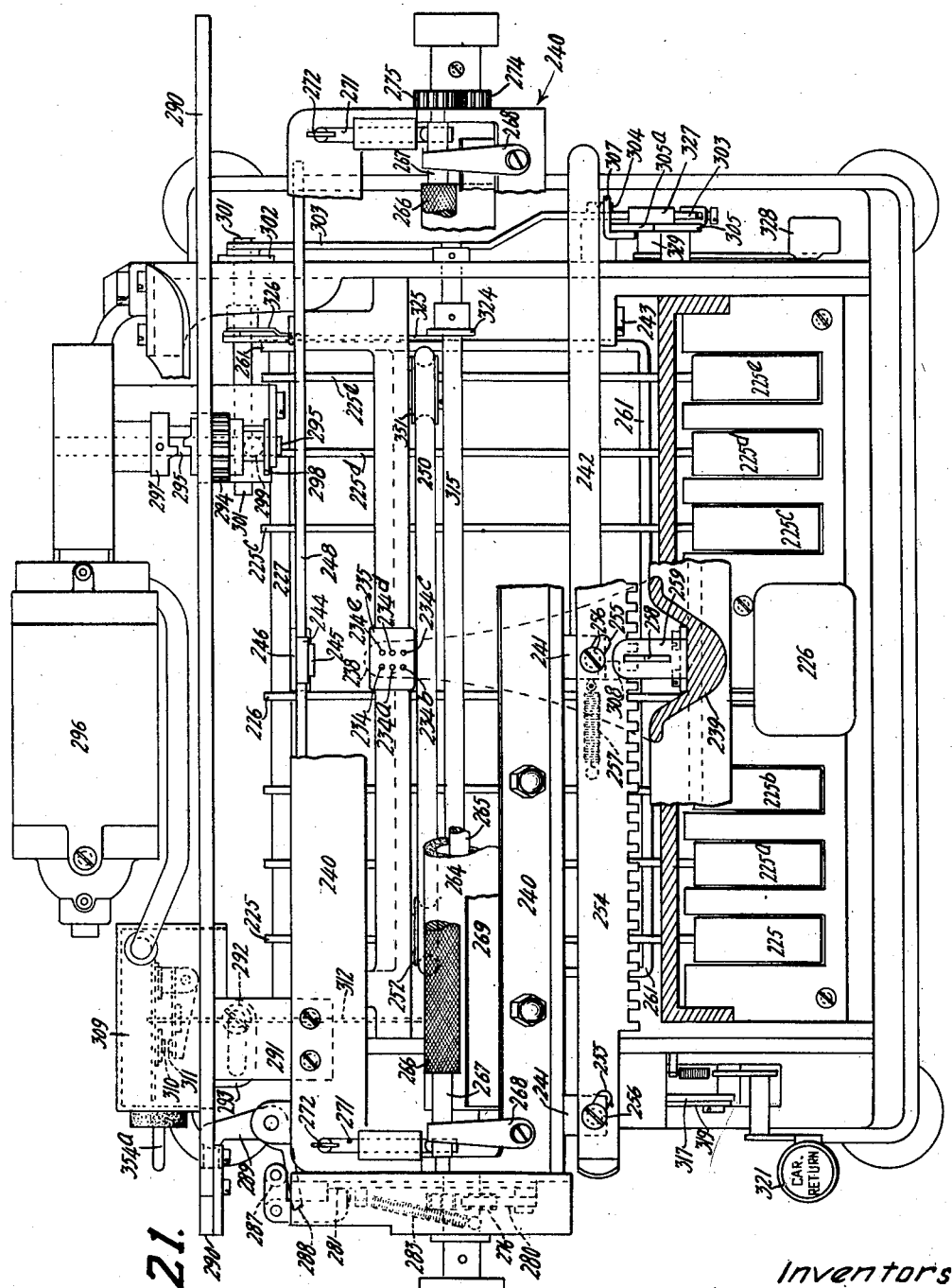

June 24, 1930. A. G. F. KUROWSKI ET AL 1,767,247
TYPEWRITING MACHINE FOR THE BLIND
Filed May 1, 1926 15 Sheets-Sheet 11
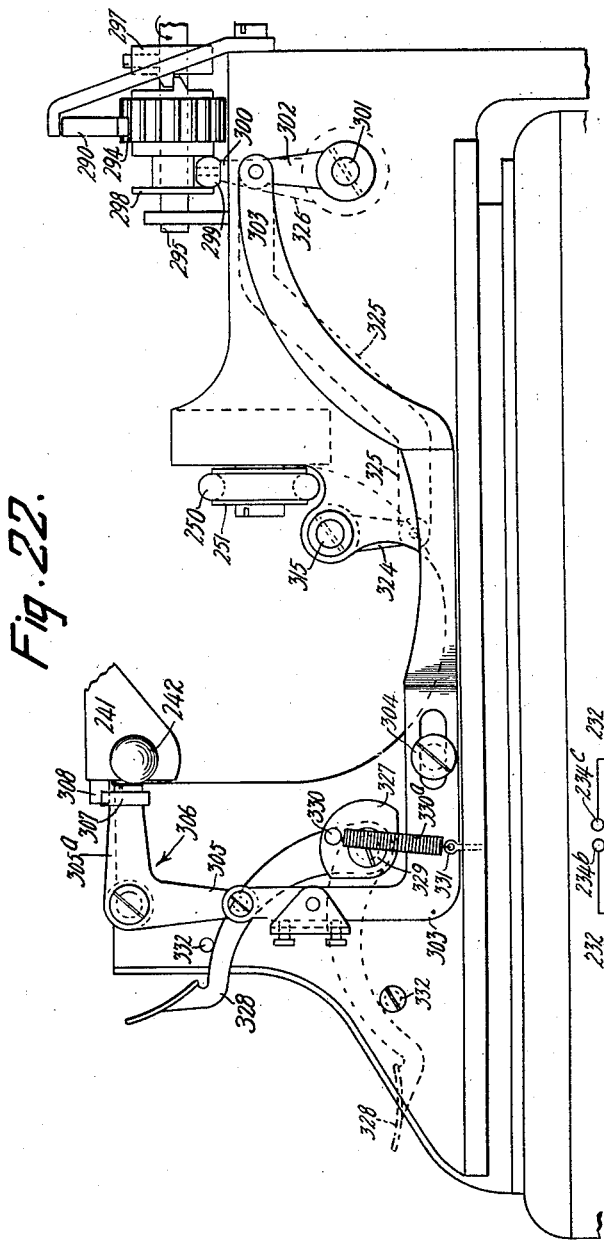
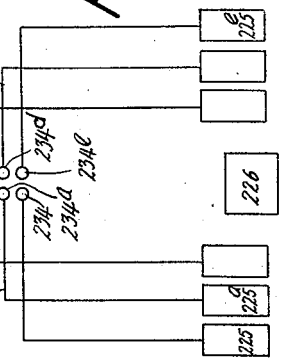
Inventors:
Alfred G. F. Kurowski
and Charles H. Lawrence
by D. C. Stickney
Attorney June 24, 1930. A. G. F. KUROWSKI ET AL 1,767,247
TYPEWRITING MACHINE FOR THE BLIND
Filed May 1, 1926 15 Sheets-Sheet 12

Inventors
Alfred G. F. Kurowski
and Charles H. Lawrence
by Stickney
Attorney

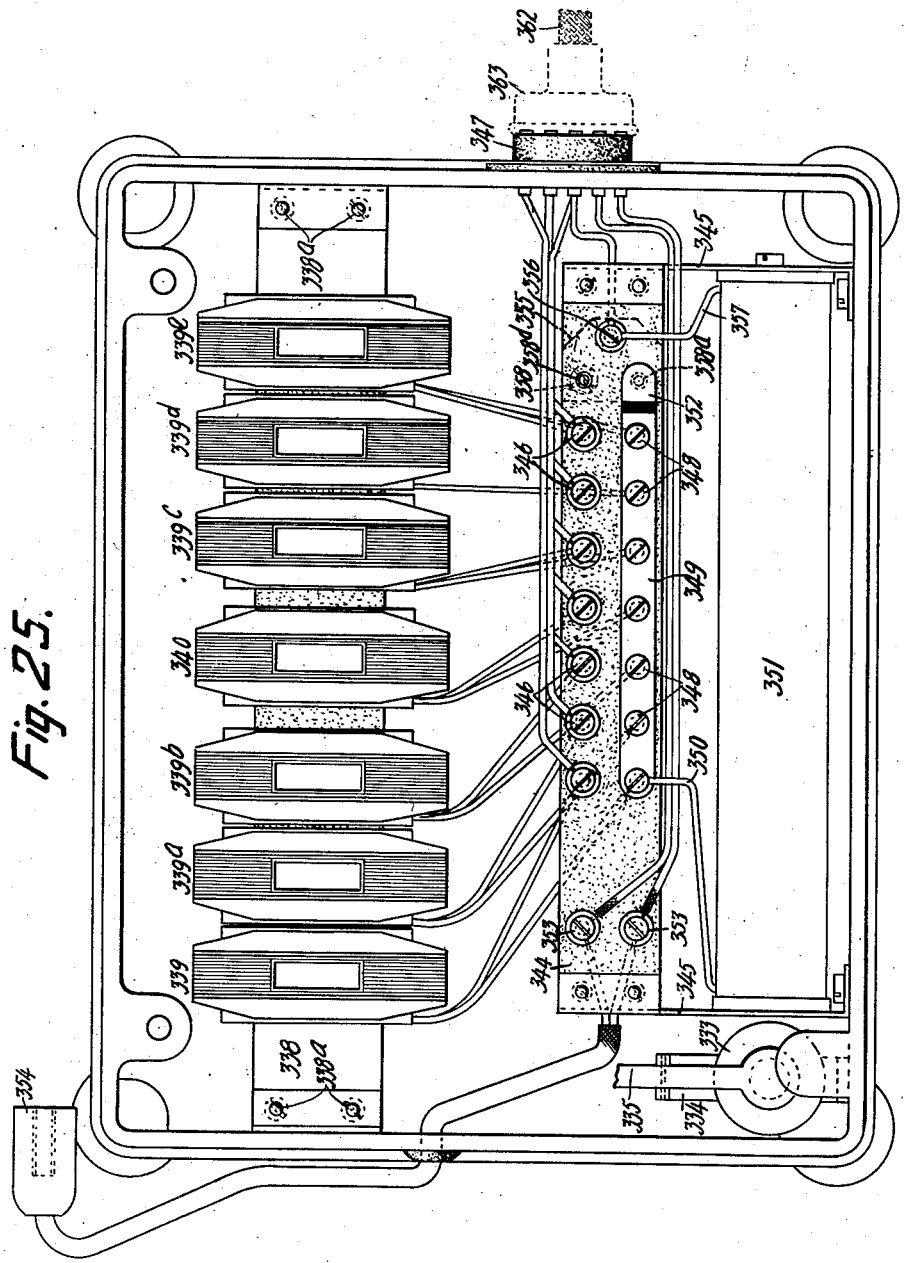

June 24, 1930.  A. G. F. KUROWSKI ET AL  1,767,247
TYPEWRITING MACHINE FOR THE BLIND
Filed May 1, 1926   15 Sheets-Sheet 14
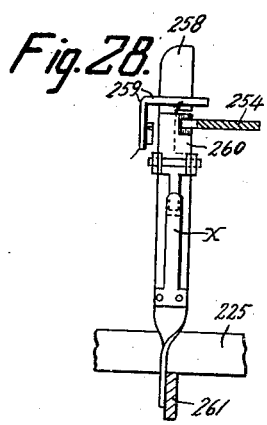
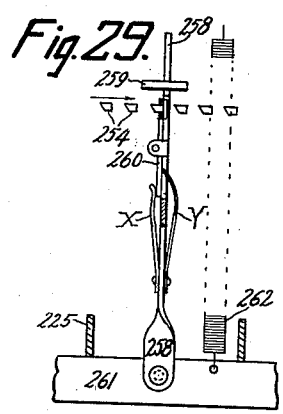
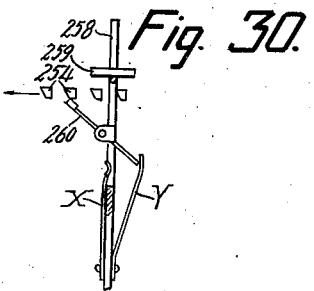
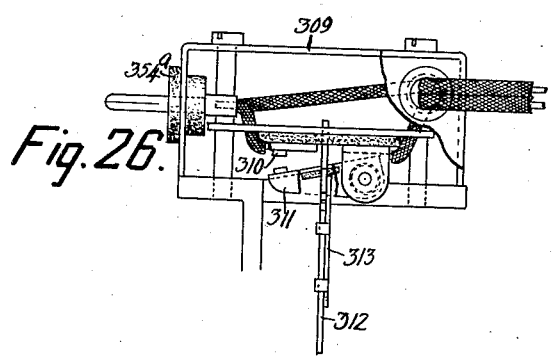
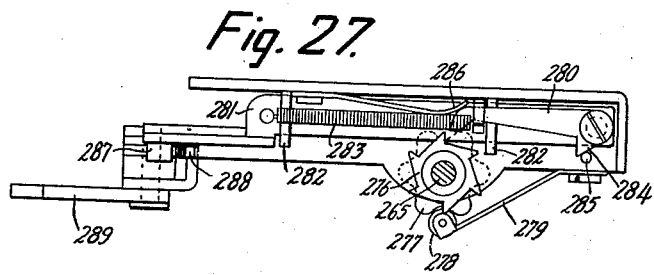

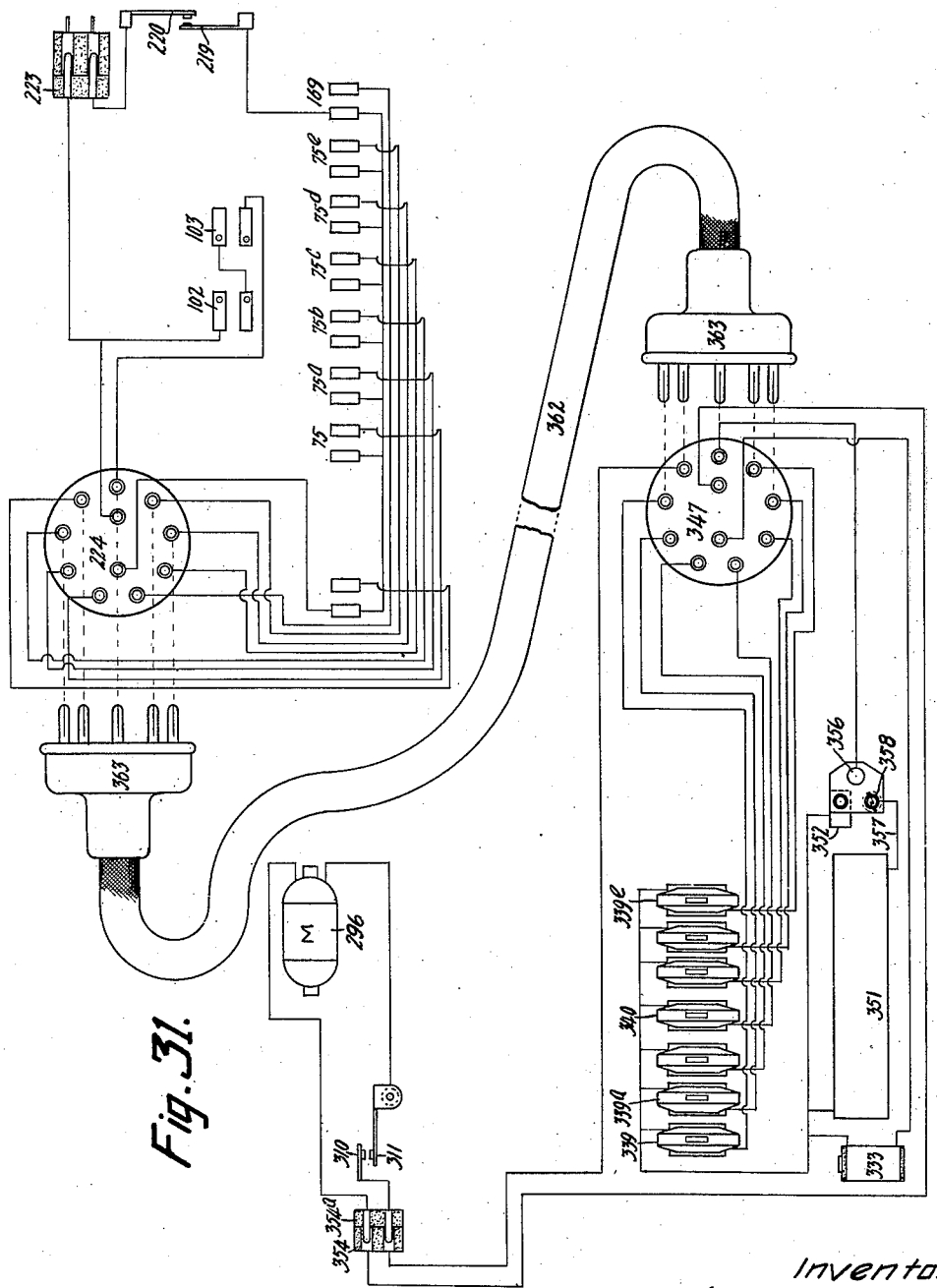

Patented June 24, 1930

1,767,247

UNITED STATES PATENT OFFICE

ALFRED G. F. KUROWSKI AND CHARLES M. LAWRENCE, OF BROOKLYN, NEW YORK, ASSIGNORS TO UNDERWOOD ELLIOTT FISHER COMPANY, OF NEW YORK, N. Y., A CORPORATION OF DELAWARE

TYPEWRITING MACHINE FOR THE BLIND

Application filed May 1, 1926. Serial No. 105,932.

This invention relates to a combination typewriter and embossing machine where typewritten characters are recorded on one sheet, and their equivalents in Braille units simultaneously embossed on a second work-sheet.

Blind persons who have become typists through the employment of raised characters on the key-caps of a typewriting machine, or who have mastered the "touch" system of key manipulation, have heretofore labored under a great disadvantage from having absolutely no means at their command to check up what they have typed; to locate an error and correct it; to make an insertion or engage in any form of tabular work requiring debit or credit calculations, and many other forms of work where vision of the work-sheet is absolutely essential.

For these reasons, though blind operators may be expert typists in the manipulation of the keyboard without error their scope of usefulness must necessarily be limited to the plainest kind of typewritten matter.

The primary object of this invention is to give vision to the blind typist and incidentally increase his latitude in typewriter manipulations; to increase his scope of usefulness by enabling him to read each character line printed upon a typewriting machine, and thus enable him to check up his own typewritten record; to make a correction or an insertion at any point in any typewritten line of the work-sheet; to tabulate a column of figures and render a sum total; or make debit and credit entries common to modern loose-leaf bookkeeping, and in fact to place the utility of the blind operator almost on a par with the more fortunate operator who can see.

To these and other ends, the invention comprises joint co-operation of two separate and distinct recording elements having individual work-sheets, one element consisting of a typewriter of standard make to record in the usual manner ink-typed impressions on its work-sheet, and a second element that preserves a record by embossing the raised pin-point characters on its work-sheet in the well-known Braille system of blind reading. The manipulation of any key of the typewriter in recording its associated inked character upon one work-sheet simultaneously operates the adjoining machine to record an equivalent character, a combination derived from a six-point unit. This translation is recorded in raised characters on a second sheet and can be read by the eye of any person familiar with the Braille writing or read by the touch of the fingers, and hence each and every character printed in ink on one work-sheet is simultaneously reproduced upon a second work-sheet in embossed relief characters of a different language. The embossing machine is preferably positioned convenient to the operator, so that at the end of each line of print the operator can conveniently brush the fingers over the embossed record, and any error in letter or word will be readily detected, thus enabling the blind operator to check up each line of print before the next line-spacing movement takes place.

Another feature provides for two separate and dissimilar recording elements that may be manipulated separately or in unison at will, enabling the operator to type for visible correspondence without embossing a second sheet, or an embossed sheet may be written separately for correspondence with a blind person.

Another feature provides for a series of printing instrumentalities arranged for a manual manipulation of a keyboard to print a visible record in one language upon one work-sheet with translating means co-operative with each manually-operated key, whereby the equivalent of each character printed is transmitted to an adjoining second series of printing instrumentalities that automatically and simultaneously record the translation in a different language.

Another feature consists of a typewriting machine having a carriage-feeding movement of standard letter-space dimensions with communicating means that simultaneously and automatically control the movement of a second carriage to provide letter-spacing movements of greater extent.

Another feature enables a person who cannot write or read the Braille system to communicate with a blind person by printing the communication upon the typewriter, whereby an embossed translation will simultaneously appear on a second work-sheet.

Another feature has two electrically-controlled base elements, one element to support a standard typewriting machine and become a transmitting medium, and the other to support a standard Braille writer and become a receiving medium through a communicating cable of any desired length from the transmitting medium.

Another feature comprises two co-operative recording machines having individual recording units, one set of units making a visible record in inked characters upon one work-sheet, and the other set of units simultaneously making an equivalent record in visible uninked characters.

Other features and advantages will hereinafter appear.

In the accompanying drawings,

Figure 2 is a vertical longitudinal section approximately through the center of the typewriting machine showing the base for the typewriter, housing the transmitting elements, some of the parts of the typewriter being omitted.

Figure 3 is a full-sized detail view of the main circuit closing elements and the tripping device that operates them, the view being taken through a plane indicated by the line 3—3 of Figure 4.

Figure 5 is a vertical cross-section through the transmitting base on a plane indicated at 5—5 of Figure 2.

Figure 6 is a full-sized sectional view taken on the line 6—6 of Figure 4.

Figures 7 and 8 are detail views of the main line cut out switch.

Figure 9 is a vertical section through the portion of the base indicated by the line 9—9 of Figure 4, showing the parts in operative position relative to the typewriter actuating members.

Figure 10 is a view similar to Figure 9 with the parts lowered to an inoperative position and with the main line cut out switch open.

Figure 11 is a detail view of the main circuit transmitting switch shown in Figure 3 and two adjoining pairs of contact.

Figure 12 is a sectional view taken on a plane just inside the right-hand wall of the base looking toward the left.

Figure 13 is a detail view of the "Fig." key and its associated connections to the circuit selecting bails.

Figure 14 is a detail view of the left-hand shift key and its associated connections.

Figure 15 is a front elevation of some of the parts shown in Figure 14.

Figure 16 is a plan view of Figure 15.

Figure 17 is a detached view taken on the line 17—17 of Figure 5.

Figure 18 is a front view of the parts shown in Figure 17.

Figure 19 is a detail diagram of the six circuit selecting bails and their relative positions to each other and to the planes of the co-operating key-levers in both normal and shifted positions corresponding, respectively, to the lower-case and upper-case positions of the typewriter carriage.

Figure 20 is a full-sized left-hand side elevation of the Braille writer and its associated operating base, portions of the base being broken away and other parts omitted.

Figure 21 is a plan view of the Braille writer with portions of the frame broken away.

Figure 22 is a right-hand side elevation of Figure 21 to illustrate the power-driven carriage-controlling connections.

Figure 23 is a diagrammatic view showing the relation of the keyboard to the six-point Braille unit.

Figure 25 is a horizontal section through the base indicated by the line 25—25 of Figure 20.

Figure 26 is a plan view partly in section of the circuit controlling switch to the carriage return motor.

Figure 27 is an end view of the carriage showing the line-spacing elements and their connections to the power driving element.

Figures 28, 29 and 30 are operational views of the carriage space feeding elements in the Braille writer.

Figure 31 is a diagram of all the electric circuits associated with the combined standard typewriter and Braille writer.

Figure 1:
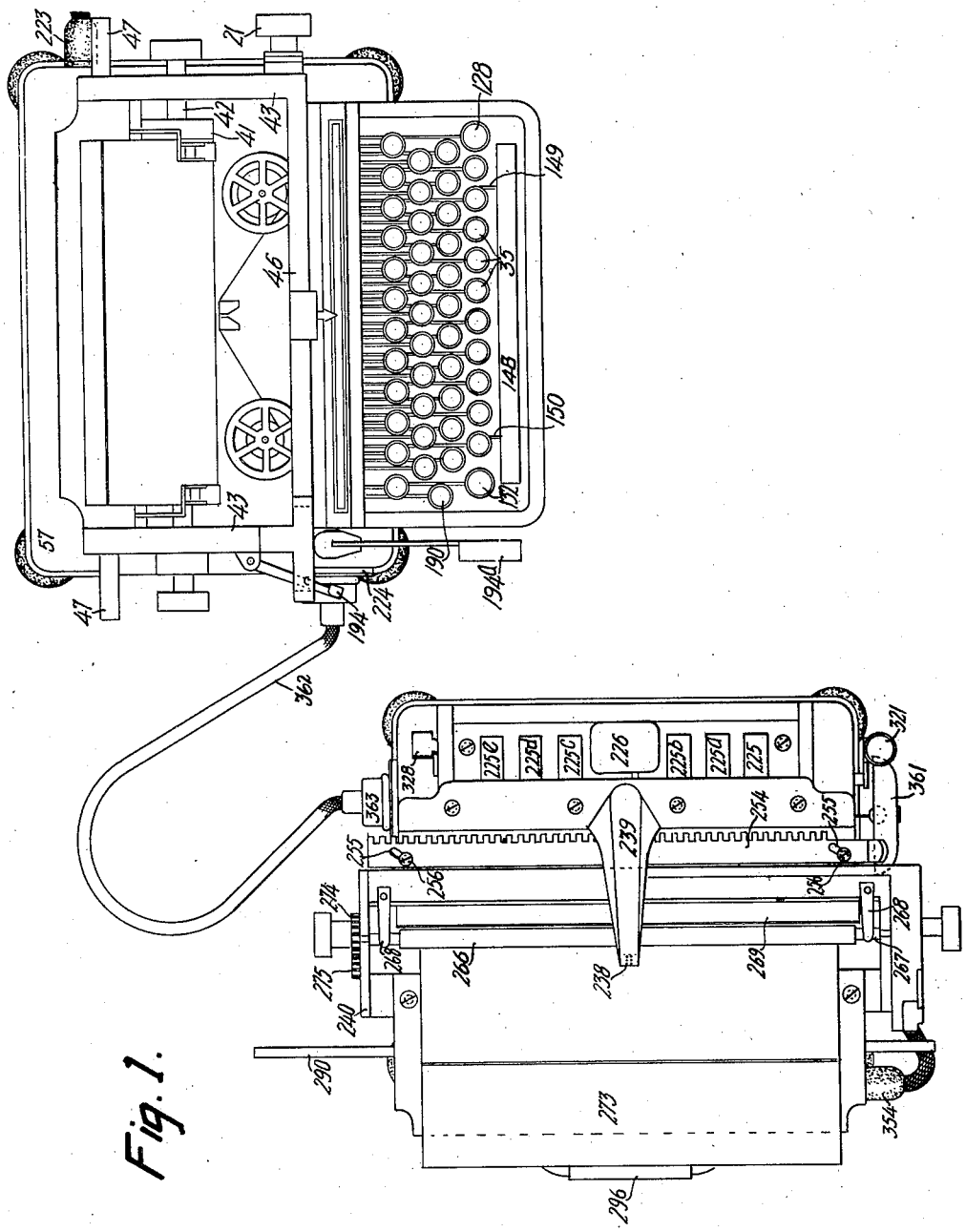
Figure 1 is a plan view of a standard Underwood typewriting machine and a Braille writer arranged in adjacent positions and connected by a flexible electric cable, whereby the Braille machine can be operated simultaneously with the operation of the typewriter according to this invention.

Referring to Figures 1 and 2, the typewriting machine illustrated is the well known Underwood, comprising a bank of character keys 35 fulcrumed at 36 to operate bell-cranks 37 mounted upon a fulcrum-wire 38 and connected to type-bars 39, that swing from a pad 40 to a common printing position against the front face of a platen 41, mounted upon a shaft 42, journaled in the end of a platen frame 43, suspended by a rock-shaft 44 and a shift rod 45, whereby the platen frame may be shifted for upper-case printing within a traveling carriage-frame 46 mounted upon rods 47 at the front and rear and propelled leftward by a spring-motor 48 connected by the usual strap to the carriage. A carriage-feed-rack 49 is secured to ends of release levers 50 pivoted to the carriage ends to engage with a pinion 51, driven by an escapement-wheel 52 interlocking with escapement-dogs 53 mounted upon a carrier 54 operated by a curved universal bar 55 vibrated by each type-bar to promote letter-spacing movements. The universal bar 55 also vibrates a ribbon carrier 56 to cover the printing point in advance of each type impact.

57 indicates a rectangular frame provided with rubber feet at each corner and formed with a continuous top ledge having four circular depressions 57ª, therein, to receive the four rubber feet of the typewriter and to more accurately adjust the two frames together. Studs 58 projecting from the lower edge of the typewriter frame serve as dowels by engaging within close fitting holes 57ᵇ in the base frame.

The downward sweep of the key-levers 35 to promote type impacts is employed to actuate selective units for a plurality of electric circuits that vary with each key-lever. To this end, there is a series of push bars or plungers 59, arranged in parallel vertical planes, the upper ends of said plungers being adjacent the lower edges of the key-levers, and mounted for a free up-and-down movement within top and bottom comb guides of a U-shaped carrier 60. The comb guide slots are cut through from the rear to provide easy assembly of the push bars and are confined in operative relation as a series by a cross-rod 61 mounted in brackets 62 on the carrier to bear against the rear edges of the push bars 59. The push bars or plungers 59 are formed of sheet metal bent over at right angles at the upper ends to form heads 63 in order to present a wide face to the edge of the co-acting key-levers, and each is also provided with a T-shaped lower terminal 64 to abut the bottom comb guide of the carrier 60 under the influence of a spring 65 secured to an ear formed in the bar and connected to a spring bar 66 inside the carrier. The carrier 60 is mounted on the rear face of a cross-bar 67 by means of three screws 68.

As shown at Figures 2, 4, 9 and 10, the T-shaped terminal 64 of each push bar or plunger 59 overhangs a series of six U-shaped levers or bails 69, 69ª, 69ᵇ, 69ᶜ, 69ᵈ, 69ᵉ, nested together to swing independently upon a rod 70 and individually spring-pressed by springs 71 against a stop rod 71ª secured in the side walls of the frame. The upper edges of the cross-pieces of the bails are mutilated by cutting notches therein to form clearance spaces where required so that a downward movement of the bars or plungers 59 overlying said notches will render such bails inactive. Hence through a methodical arrangement of these clearance slots in the series of six bails, each one of the series of forty-two push bars 59 will co-act with a different combination of bails, and, accordingly, for each key-lever 35 and its associated type-bar 39, a different combination of bails will be actuated. The relative position of these clearance slots in each bail is shown in Figure 19, where the upper set of six bails indicates the setting for the lower-case levers of the typewriter and the relative key-lever positions in cross lines.

Figure 4:
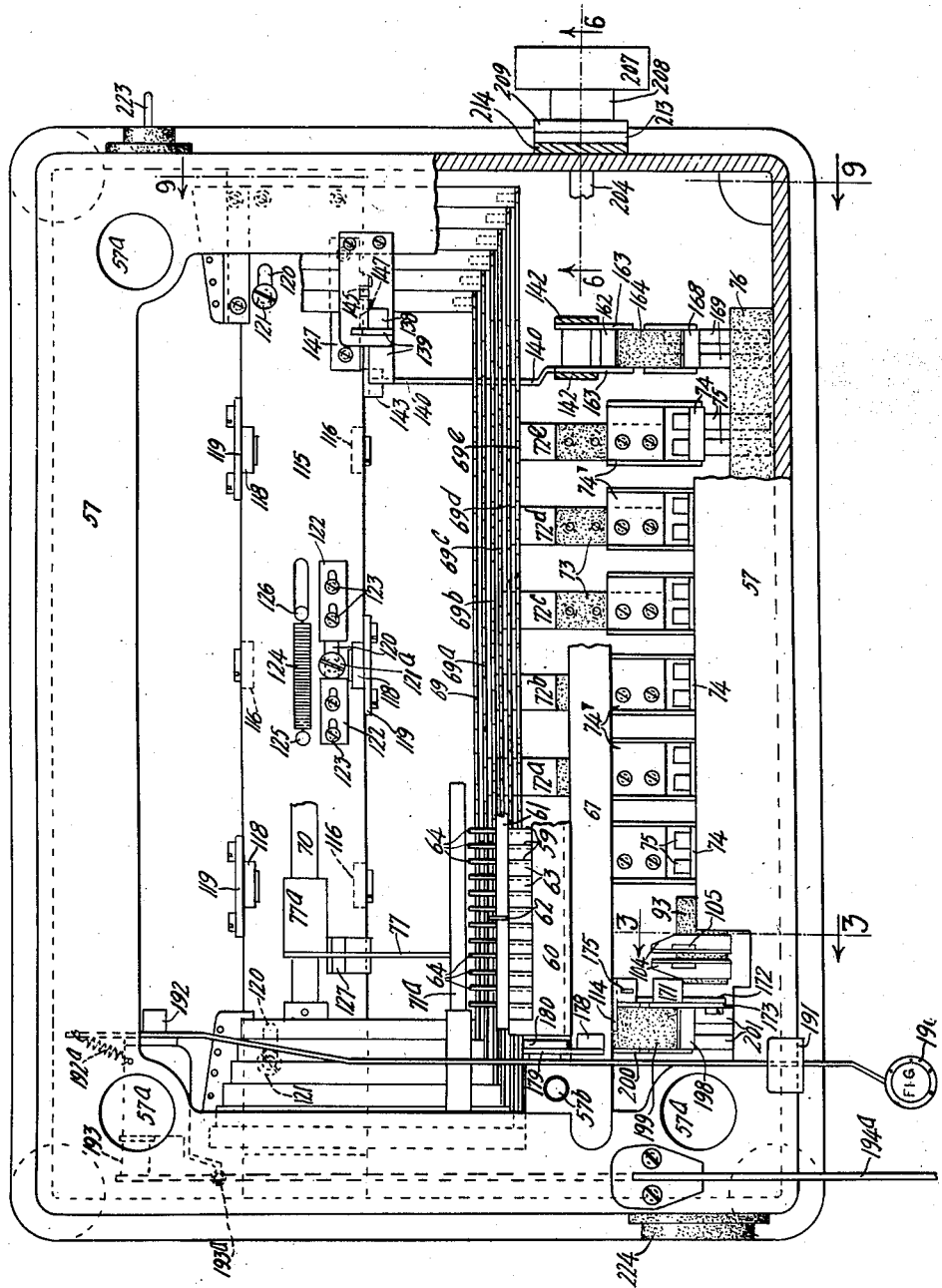
Figure 4 is a plan view of the transmitting base with some of the parts and casing broken away.

As shown in Figures 4 and 5, each bail 69, 69ª to 69ᵉ is formed with a tongue 72, 72ª to 72ᵉ, respectively, at the lower edge and positioned to assume six different positions relative to the length of the bails, but aligned in a uniform horizontal plane. Each tongue carries a block of insulation 73 secured to its upper face to insulate the tongue from a contact roller 74, mounted within a carrier 74' that is secured to each block. These rollers are arranged to make a rolling electric contact with six pairs of contact springs 75 suspended from a block of insulation 76 secured to the front wall of the base for the purpose of closing the circuit across each pair of springs. The initial movement of the rollers 74 closes the circuit through their associated springs and then rolls over their surfaces for the remainder of their movement. Hence said springs must maintain a degree of resilient tension against the rollers to maintain an operative electrical contact, and were the two springs in a live circuit, the closing of the circuit by the rollers would result in excessive sparking and the thin material of which these springs are made, would soon become soft and useless through the fusing of the metal. The function therefore of each roller is to prematurely close a dead circuit through the springs that subsequently become a live circuit through the subsequent operation of closing a main line switch that employs contact points of heat resisting material and confining any fusing trouble at a single point. To this end, a universal lever 77 is hung from the rod 70 to underlie the six bails 69, 69ª to 69ᵉ with the free end rounded upwardly and bent laterally at right angles to form an ear 78 (Figures 3, 5, 9, 10, 17 and 18) that rides upon the edge of a crank-arm 79 mounted on a shaft 80 and urged against said ear by a spring 81 secured to an arm 82 joined to the crank-arm 79 by a sleeve 83 free to turn upon the shaft 80 and connected to a spring stud 84 in the cross-bar 67. A tripping pawl 85 is carried by the crank-arm 79 on a stud 86, its free end being urged against a fixed stop 87, integral with arm 79, by a spring 88 which connects one end of the pawl to an arm 89.

To co-operate with the tripping pawl 85, a main circuit switch is arranged to be operated thereby comprising a contact rocker 90 of insulating material that vibrates about a horizontal pivot 91 (Figures 3 and 11) threaded into an insulating block 92 formed with two lugs 93 and 94 that house the rocker 90 on three sides. The block 92 is suspended upon screws 95 that pass through spacing-sleeves 96 and threaded into a second block of insulation 97 secured to the inside front wall of the base by screws 98. The rocker 90 is spring-pressed against a fixed stop 99 by a spring 100 secured to the face of block 92 with one end engaging a pin 101 projecting from the face of the rocker 90. The rocker 90 carries a pair of contacts 102 and a pair of contacts 103 at the upper and lower ends respectively, but on opposite sides of the rocker. To each of the upper and lower faces of the lugs 93 and 94, a pair of angular brackets 104 are secured that provide pivotal supports at 105 for a pair of arms 106 and 107. These arms overhang the faces of the lugs on opposite sides and are formed with bent-over ears carrying contact points 108 and 109 arranged to register with the contacts 102 and 103 respectively.

Each arm 106 and 107 is pressed against the adjacent face of the lugs 93 and 94 by a spring 110 connecting a stud on the arms with an upturned ear 111 on the brackets 104, said ears serving as terminals to which a conducting wire may be soldered. The rocker 90 is formed with a ledge 112 to sustain a metal shoe 113 that co-acts with the tripping pawl 85.

From the description up to this point, it will be seen that a down stroke of a key 35 depresses a plunger 59 and vibrates a predetermined number of bails that swing their associated rollers 74 to wipe across a pair of spring contacts 75 so as to prematurely close a dead circuit during the initial movement of the plunger, and until the down stroke of the plunger is completed, said rollers brush over the surface of the springs. The downward movement of any bail or bails vibrates the universal lever 77, which in turn vibrates the crank-arm 79 to swing the tripping pawl 85 through a path intercepted by the shoe 113 of the rocker 90 which is vibrated by said pawl after a full contact has been made between the rollers 74 and their springs 75 to bring the contacts 102 and 103 into engagement with the contacts 108 and 109. The springs 110 provide flexibility to the union of these four contacts and any superfluous movement of said rocker will cause the arms 106 and 107 to vibrate and flex said springs 110. When the tripping pawl 85 has passed to a point near the extreme end of the stroke, the shoe 113 is released to the action of its spring 100 and the rocker 90 is restored to its inoperative position against its stop pin 99, and during this movement the main line circuit is broken or opened, due to the separation of the contacts 102 and 103 from the contacts 108 and 109. Hence with the down stroke of any selective key, a predetermined number of circuits have been thrown into the main line and the main line closed through them all simultaneously. Upon the return stroke of the key, the pawl 85 will be urged upwardly together with the ear 78 through the action of the spring 81 and the pawl will snap by the fixed position of the shoe 113 vibrating about its pivot and flexing its spring 88.

As previously set forth, the typewriter cooperates with base elements to type characters and simultaneously translate the value of these characters into combinations of impressions that can be reassembled by a distant machine to produce a new record. In the present case, the value of the typewritten characters is translated into combinations derived from a six-point unit common to the Braille system of writing and for this reason six bails are employed, each bail indicating a Braille unit which is a dot. By consulting the chart of Figure 19, the vertical line marked A, which indicates the A key position, cuts through slots in five of the bails and only operates the upper bail 69, indicating that the letter A, translated into Braille units, consists of a single dot or unit. Similarly, the letter Q key operates the first five bails but not the sixth, indicating that the letter Q is composed of five Braille units. In this manner all the lower-case characters of a typewriter are translated into their equivalents in Braille units by arranging alternate slots and tongues where they are required in the upper edges of the cross-arms of the six bails to co-operate with the T terminal 64 of the push bars 59. These bails which are selective elements make no distinction between the lower and upper case characters; a small "a" and a capital "A" will each operate the bail 69 only. Hence the shifting of the platen of the typewriter to upper-case position does not affect these letters of the alphabet, but there are other keys like the numeral keys and certain punctuation keys that print different characters in the shift position, and as the key-lever position of the typewriter cannot be changed relatively to the bails, the bails must be changed relatively to the key-levers, so that when a carriage shifting movement to upper-case position takes place the bails must shift their position to bring up a new set of units descriptive of those characters that differ from the lower-case type.

The rod 70 that carries the six bails is secured at each end to brackets 114 of a carrier 115 in the form of a flat metal plate resting upon a series of anti-friction rollers 116 mounted upon stationary pivot screws threaded into the edges of a supporting cross-bar 117, and bearing against the lower face of the carrier plate 115. A second series of rollers 118 is hung from upright brackets 119 secured to the edges of the bar 117 upon each side in such a manner that said rollers will bear against the upper face of the carrier plate 115. To guide the carrier plate and the several parts mounted thereon, the plate is formed with slots 120 to receive screws 121 threaded into the cross-bar 117, and the longitudinal movement of the carrier is limited in either direction between adjustable stop elements or plates 122 which are secured to the face of the carrier by screws 123 to abut the center screw 121ª, as may be seen in Figure 4. The normal position of the carrier is maintained by a spring 124 secured between one stud 125 on the carrier and a second stud 126 passing through a slot in the carrier and entering the bar 117. The universal lever 77 also swings upon the rod 70 but does not shift with it. Hence it is given a long sleeve 77ª for a bearing and swings up and down within a stationary fork 127 secured to the edge of the bar 117.

To effect a shifting movement of the carrier plate 115, the right-hand shift key 128, which is the usual shift lock key in the typewriter, is actuated, and a spring latch 129 engages a stud 130 on the lever to lock the lever in a depressed position (Figure 12). The lever may be released by actuating a finger knob 131 on the latch, or by depressing the left-hand shift key 132 (Figure 14), provided with a stud 133 that cams a bell-crank 134 to rock the shaft 135 that carries the latch 129. These parts are all standard Underwood construction and have been described in detail because of dissimilar functions performed by each shift key relative to the electrical transmission to be described later on.

The shift key 128 is fulcrumed to the wire 36 and is formed with a crank arm 136 to vibrate the carriage rocker arm 137 so as to shift the carriage to upper-case position. This carriage-shifting movement of the key 128 simultaneously engages with a roller 138 pivotally mounted at the upper end of an arm 139 of a bell-crank formed with a second arm 140 that swings about a pivot 141 within a U-shaped bracket 142 secured to the under face of the cross-bar 67. At a point where the two arms 139 and 140 join together at a right angle, the bell-crank so formed rests upon an ear 143 forming part of a lever 144 pivoted to the edge of the bar 117 and having an arm 145 connected by a spring 146 to a stud on the base 117 (Figures 5 and 12). The arm 145 is enclosed on each side by a tongue of a forked piece 147 secured to the carrier 115, and hence a downward movement of the key 128 depresses the bell-crank 139—140 to swing the lever 144 and shift the carrier in unison with the arm 145 to the left in Figure 4, to a stop position, and the latch 129 will snap over the stud 130. The carriage will then have been raised to upper-case position and locked, and the carrier 115 shifted to the left and the whole series of bails also moved to the left a dimension of "X" (Figure 19). Examination of the lower set of six bails relative to the vertical key-lever positions in said figure will show that all the letters of the alphabet operate the same bails in both diagrams; but that the numeral "3" key operates the bails 69 and 69ᶜ for a two-point unit in the upper diagram and bails 69ᵇ, 69ᶜ, 69ᵈ and 69ᵉ in the lower diagram for a four-point Braille unit denoting the sign for the typewriter character "#". This shifting movement of the bails in unison with the shifting of the carriage provides that a type printing element having two distinct and dissimilar type-faces, and operated by the same key action, can transmit two dissimilar values.

The character keys, both upper and lower case, all have an equivalent in Braille units, and, as in the present case, the typewriting elements automatically operate a Braille printer simultaneously and the spacing of the work-sheet on the typewriter must also convey its equivalent movement to the Braille machine so as to keep both machines in synchronism.

The space-bar 148 (Figures 1, 2 and 12) extends across the front of the keyboard and is mounted upon the forward ends of two levers, one lever 149 (Figure 12) at the right-hand side, and another lever 150 at the left-hand side of the machine, both joined together at their rear ends by a rock-shaft 151 fulcrumed at each end and in the side frame of the machine, and spring-pressed against the stop 152 by a spring 153 coiled about the shaft 151. This frame is further stiffened by a tie-rod 154 joining the two levers together intermediate the rock-shaft and the bar.

The rock-shaft carries an arm 155 arranged to engage with a member of the escapement-carrier 54 to effect a letter-space movement at each depression of the bar 148 (Figure 2). To co-operate with the space-bar and promote electrical connection with a Braille writer the lever 149 (Figure 12) has an arm 156 attached to the side thereof, the free end 157 being bent at right angles to form a wide-face shoe to engage with the upper end of a vertically-disposed push bar 158 capable of sliding up and down within slots formed in the two ears of a U-shaped bracket 160 secured to the face of the cross-bar 67. The lower free end of the bar 158 is enlarged to form a foot 161, to engage a roller 162 mounted between two metal side plates 163 fixed to a separating block of insulation 164 and a sleeve 165 that rotates about a fixed pin 166 within the walls of the bracket 142 and urged upwardly by a spring 167 coiled about said sleeve.

To the free end of the insulating block 164 two metal side plates are secured to provide a bearing at each side for a roller 168. The roller 168 is thus insulated from the roller 162. A depression of the space-bar 148 swings the roller 168 into engagement with two contact springs 169 secured to the insulating block 76, at the initial movement of the bar. Simultaneously a heel 170 on the lever 150 at the opposite end of the space-bar engages with a foot 171 (Figures 2, 9, 10 and 17) of a sub-lever 172 fulcrumed at the end of an arm 173 forming part of a bracket 174 secured to the face of the cross-bar 67, and further provided with a pair of slotted ears 175 to receive a vertical push bar or plunger 176 that rests upon the upper edge of the ear 78 of the universal lever 77 and is operated by the slotted end of the lever 172 engaging a stud on the side of the bar 176. The dead circuit through the springs 169 having been previously closed through the roller 168 operated by the lever 149 of the space-bar 148, the continued movement of the space-bar causes the bar 176 to depress the universal lever 77 to operate the tripping pawl 85 and close the main line switch to the springs 169, as previously described for the springs 75.

The operation of the right-hand shift key 128 is mechanical and has no function except to shift the carriage to upper-case position and simultaneously shift the bails as a series. The left-hand shift key 132 not only shifts the carriage for upper-case writing when capitals are to be printed, but it also has a means to establish its identity by transmitting a single Braille unit as a prefix to the next succeeding character to denote that the character following is a capital, and as this key must be held depressed by the finger during the printing operation it must operate independently and transmit to the main line circuit its characteristic impulse.

To this end, the left-hand shift key 132 (Figures 14, 15 and 16) has a shoe 177 to engage with a roller 178 at the upper end of a slide member 179 mounted for vertical up-and-down movement against the face of a U-shaped bracket 180 upon guide-screws 181 that enter elongated holes 182 in the slide. The bracket 180 is formed with an ear 183 by which the bracket is suspended over the bails and secured to the face of the carrier 60. The slide 179 has an ear 184 to which a pawl 185 is pivotally hung to align with the upper edge of the bail 69$^e$ and provided with a spring 186 to hold the pawl against a stop pin 187. The depression of the slide 179 by the key 132 depresses the bail 69$^e$ and the universal lever 77, which first brings the roller 74 associated with the bail 69$^e$ into contact with the springs 75, and while this contact is maintained, through the action of the universal lever 77, the tripping pawl 85 will vibrate the rocker 90 and close the main line circuit through the springs 75 to the main line. By the time these contacts are completed, a lip 188 on the pawl 185 has been lowered into engagement with an intercepting arm 189 secured to the under side of the bracket 180, and, as the depression of the slide 179 continues toward the end of its stroke, the lip 188 will cam the pawl 185 and cause the end abutting the bail 69$^e$ to slide off the edge thereof, thus releasing the bail and lever 77 to be restored by their springs. The operating of these contacts through the bail 69$^e$ during the down stroke of the shift key 132 prints a single Braille unit that is a prefix indicating to the reader that the next succeeding character is a capital letter.

In the braille system, the ten numerals "1 to 0" have the same combination of units as the first ten letters of the alphabet, and to enable the reader to distinguish the numeral "1" from the letter "A" a prefix consisting of a four-point unit is recorded before the number itself is printed. This is accomplished by providing a special key lever 190 at the left of the keyboard guided by a comb 191 at the front wall of the base and pivoted at 192 and held in a raised position by a spring 192$^a$ (Figure 13). This lever has a foot 190$^a$ that overlies the four bails 69$^b$, 69$^c$, 69$^d$ and 69$^e$. Hence, when said key is depressed the four bails simultaneously close the circuits through their respective springs 75 and the universal lever 77 operates the tripping pawl 85 to close the main line circuit through these connections, as previously described.

The line-spacing of the typewriter is accomplished in the usual Underwood manner by a rightward movement of the line-space lever 194 (Figure 1). As the operator on the typewriter automatically controls the movement of the work-sheet on the Braille machine, the line-spacing and carriage-return movement of the latter must be in unison with the similar movements of the typewriter. At Figures 1, 2, 4, 5 and 9, a special key lever 194$^a$ is provided at the left hand of the keyboard that passes down through the top wall of the base, Figure 9, to pass under the shaft 80 and thence rearwardly to be fulcrumed at the rear of the machine at 193 and provided with a spring 193$^a$. The shaft 80 takes bearings within two brackets 195 and 195$^a$, one secured to the under side of the cross-bar 67, and the other to the under side of the top wall of the base. The free end of the shaft outside the bracket 195$^a$ carries a crank-arm 196 that is slotted at the end to engage with a stud 197 on the adjacent face of the key lever 194$^a$ to transmit a rocking movement to the shaft 80 when said key lever 194$^a$ is depressed. The shaft 80 carries a contact roller 198 similar to those previously described where the roller is mounted on a block of insulation 199 secured between metal side plates 200 which are fastened to the shaft 80 (Figure 9). A pair of springs 201 mounted on an insulating block 202 is positioned to align with the roller 198. The depression of the key lever 194$^a$ operates the rock-shaft 80 first to bring the roller 198 into contact with the springs 201, and then to rock the tripping pawl 85 through a pin 203 fixed to one of the side plates 200 and overhanging the upper edge of the crank-arm 79 to vibrate said pawl 85 and close the main line circuit as previously described.

With the mechanism thus described, means have been provided whereby the typewriting elements operate to print upon a worksheet and simultaneously translate the typewritten records for transmission to a second machine, making a simultaneous but dissimilar record through elements contained in a base under the typewriter. It may be convenient at times to cut out these translating elements and use the typewriter as a single unit, and, for this reason, means are provided to lower the operative parts of the base that are operated by a key manipulation and thus release the typewriter keys from this extra burden when typewriting alone is done.

As previously described the carrier 60 is mounted on the rear face of the cross-bar 67 by the screws 68. These screws hold the carrier against the face of the bar, and, by working within slots 68$^a$, permit an up-and-down movement of the carrier and the parts mounted thereon. To effect this shifting movement of the carrier, the cross-bar 67 is recessed through the central portion as indicated at 67$^a$, and across this recessed portion a shaft 204 is arranged to take end bearing within the left-hand end of the bar 67 (Figure 5) and with the opposite end bearing and passing through the right-hand end of the bar and through the base to project on the outside. This shaft carries two pinions 205 fixed to the shaft and abutting the opposite recessed faces of the bar 67 to prevent endwise movement and to engage with rack-teeth 206 cut into the adjacent face of the carrier 60. Hence by turning the shaft and the pinions, the carrier may be raised or lowered. To promote the turning of the shaft 204 from the outside, a finger-wheel 207 may be secured to a metal sleeve 208 formed with a flange 209 (Figure 6). The sleeve and finger-wheel turn freely upon the shaft 204 and are held thereon by a screw 210 threaded into the end of the shaft and confining a spring 211 housed within the sleeve 208 and compressed between the end wall of the housing chamber and the head of the screw. The sleeve 208 carries a dowel pin 212 disposed to pass through a hole in a disk 213 pinned to the shaft 204 and projecting through the disk to register with either of two holes in the adjacent face of an angular plate 214 secured to the base. By drawing the finger-wheel to the right (Figure 6), the spring is compressed and the dowel withdrawn from one hole in the plate 214, the dowel acting as a driver for the disk 213. The shaft may be rotated in a clockwise direction to rotate the pinions 205 and lower the carrier 60 until a stop plate 215 strikes the top face of the bar 67 when the finger-wheel may be released and the dowel will enter the second hole in the stationary plate 214 and thus lock the carrier in a lowered or inoperative position shown at Figure 10. To indicate the two set positions of the carrier, in upper active position and in lowered idle position, the finger-wheel 207 may have two reference plates 216 set in the face thereof, one marked "On" and the other marked "Off."

At Figure 9, the several parts are shown in operative position with the typewriter elements that operate them, and Figure 10 shows the same parts lowered to an inoperative position. In shifting from the position of Figure 9 to that of Figure 10, it will be seen that the six bails have been depressed, and, in passing to this latter position, all six rollers 74 have been brought into contact with their respective tripping springs 75, and that the tripping pawl 85 has operated the contact rocker 90, and the main line circuits through all these springs have transmitted an equivalent of the whole series of six Braille units and may be interpreted by a blind person as the end of a communication.

The raising and lowering of the carrier 60 also acts to make and break the main line circuit by automatically closing and opening a safety switch to insure an open circuit when it is desired to disconnect the typewriter from the Braille transmitting means. In lowering the carrier 60, it is necessary that the safety or cutout switch remain closed until after the six Braille units have been embossed, one reason being that it is desirable to have an indication on the Braille machine evident to the touch of a blind operator to the effect that the apparatus is turned off to inactive condition. To this end, the switch comprises two contact elements 219 and 220 mounted upon a block of insulation 217 (Figures 7, 8, 9 and 10) secured to the under face of the ledge of the base casting by screws 218 passing through the wall and threaded into the block. A contact element 219 projects laterally from the block 217 and is rigidly fixed, whereas contact element 220 has its free end portion bent at right angles, and, due to its resiliency, is spring-pressed against contact element 219 so that normally the circuit is closed. A bracket 222 is attached to the extreme end of the bottom comb guide and adjacent the cutout switch, and to the bracket 222 an upwardly-extending hook-shaped member 221$^a$ is attached. It will thus be noted that upon initial downward movement of the carrier, the six bails will swing downwardly, the latter closing the embossing key circuits, and the universal lever 77, through the action of the bails, will trip the main line switch to make and break the circuit, the safety or cutout switch during this time being closed. Immediately after the six Braille units have been embossed and upon further downward movement of the carrier, the hook-shaped member 221ª will engage the contact element 220 to pry said element away from the contact element 219, thus breaking the circuit. Upon raising the carrier to operative position, the member 221ª will become disengaged from the resilient contact element 220, which will return to circuit-closing position. To insure against poor contact between elements 219 and 220, a stud 221 is fixed to bracket 222, so that in normal position the stud will bear against contact element 220. The bracket 222 is formed with an angular edge similar to the terminals 64 that rest upon the six bails, and this edge depresses the bails when the carrier is lowered.

Referring to Figures 4 and 5 at the rear right-hand face of the base, a terminal of an electric plug 223 is shown that leads to an electric light circuit. From this point, the circuits run through the several springs 75 and contact rocker 90 to a distributing plug 224 at the front left-hand corner of the base consisting of eleven contact points, each point being connected to a main line circuit that passes through an eleven-wire cable to the Braille machine to be presently described. Six of these circuits embrace the six springs 75, one for the springs 169, one for the rocker 90, two for the carriage-return springs 201, and one for the return circuit.

Referring to Figures 20 and 21, the Braille writer consists of a keyboard with six key-levers 225, 225ª to 225ᵉ and a space-key 226. The six key-levers are fulcrumed upon a rod 227 and spaced in parallel planes by a rear comb 228 and a front comb 229, and maintained in raised position by individual springs 230 hooked to the Braille frame. Each of the six key-levers at a point in front of the fulcrum rod 227 has a connection to a link 231. The links 231 are connected to the outer ends of horizontal levers 232 fulcrumed adjacent their centers upon screws 233 threaded into the frame, and the inner ends of the levers 232 are connected to vibrate push pins or plungers 234, 234ª to 234ᵉ that pass freely through holes in a lug 235 forming part of the frame. These push pins are nested together in rectangular profile arranged in three rows, each row having two pins, and compose a six-point unit from which all the Braille characters are derived. The levers 232 vary in length but not in leverage. Hence the uniform dip of the keys will move the push pins 234 uniform distances, and each lever 232 may be provided with a spring 236 anchored to a spring plate 237 secured to the frame. Immediately over the lug 235 is a platen or anvil 238 containing six die holes to co-act with the six pins 234 to emboss rounded Braille units in the upper face of the work-sheet when the latter is adjusted between the lug 235 and the anvil 238. The anvil face is formed at the end of a horn 239 secured to the front upper portion of the frame of the machine, and curved to form an arch over the carriage.

The traveling carriage comprises a rectangular frame 240 formed with three lugs 241 along the front edge that are slidably mounted upon a rod 242 fixed at the ends to the Braille frame with screws 243. The rear side of the carriage is guided by a roller 244 rotating about a screw 245 threaded into a bracket 246 secured to the rear bar of the carriage at the center thereof and formed with a bent-over tongue 247 to hook under the edge of a rail 248 secured to lugs 249 on the frame. The carriage is urged to the left by a tension spring which in this instance comprises a long close-wound spiral spring 250 (Figure 24) having one end secured to the carriage end, and then traversing the width of the machine to pass over an idler roller 251, and then back to pass over a second roller 252, and then across the machine again where the end connects with a threaded eye bolt 253 that passes through the wall of the frame and has a knurled nut on the outside of the frame to adjust the tension of the spring.

Figure 24:
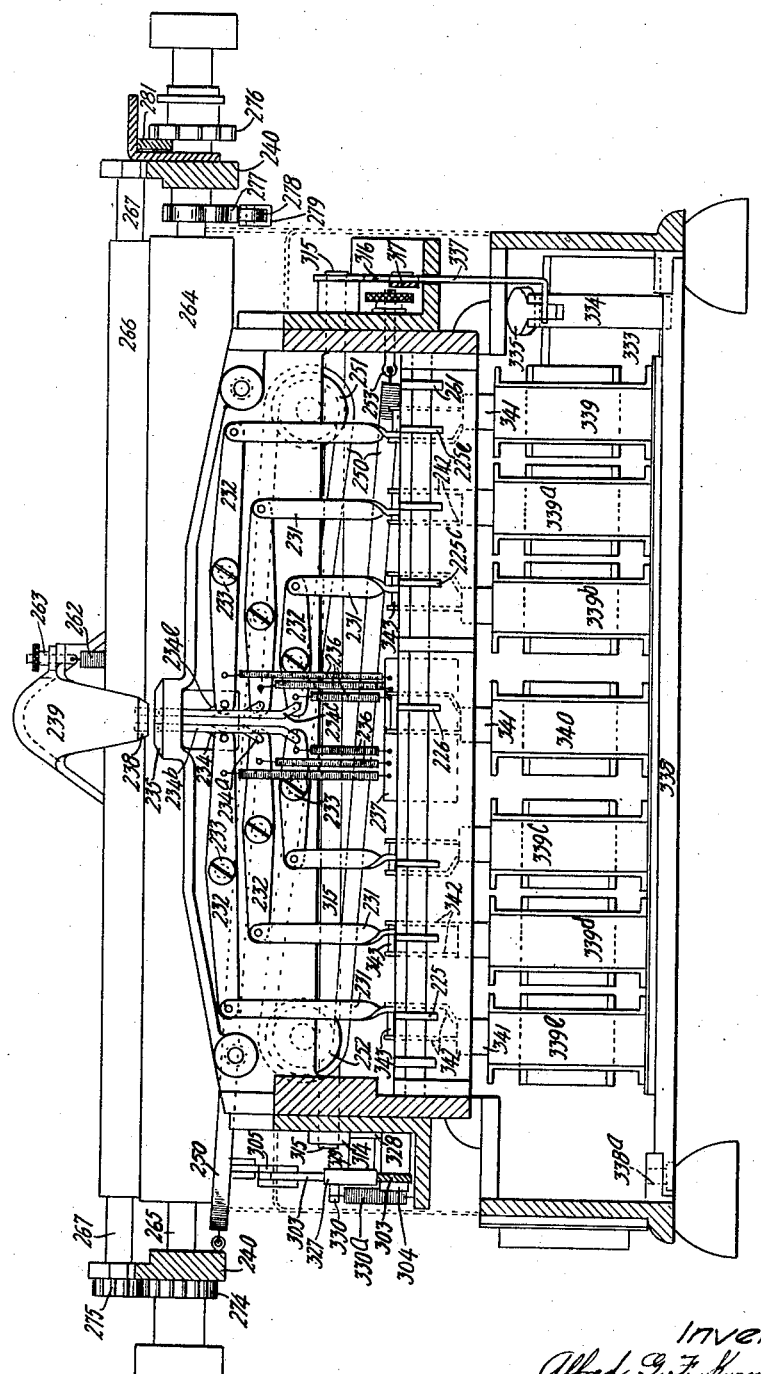
Figure 24 is a vertical cross-section upon the line 24—24 of Figure 20.

To control the carriage movement leftward uniform distances, a rack-bar 254 is horizontally disposed on the upper face of the three lugs 241 and formed with diagonal slots 255 to receive screws 256 that hold said bar against the lugs, but permit the bar to be shifted diagonally to the left and rear in parallel relation. The bar is maintained in its normal position by a spring 257 connected to the middle lug 241 to draw the bar towards the right hand (Figure 21). To co-operate with this rack-bar, a pair of vertically-disposed feed dogs are arranged for vertical up-and-down movement, including a dog 258 extending upwardly within the horn 239 through a guide-plate 259 (Figures 28—29) secured within the horn. The dog 258 carries a stepping dog 260 pivoted thereto, and the former is pivoted to a universal bar 261 formed as a bail to underlie all the key-levers and fulcrumed on the rod 227. A downward movement of the universal bar withdraws the stepping dog 260 from the engaging tooth in the rack-bar 254, and the dog 258 becomes a holding dog without any movement of the carriage. The return movement of the universal bar to restore the dogs is effected by a spring 262 connecting the bar with an adjusting screw and nut 263 at the side of the horn 239 (Figure 24). The stepping dog 260 is maintained between two flat springs, one on each side of the dog; one spring $y$ to hold the dog 260 against the face of the dog 258 (Figure 29), and the other spring $x$ to control the dog 260 when the carriage is returned to the right hand as shown at Figure 30.

The carriage frame 240, instead of carrying a platen, carries only paper feeding and paper guiding means for the work-sheet. These means include a soft rubber covered feed-roll 264 mounted upon a shaft 265 that takes bearings in both end bars of the carriage where the free ends are provided with the usual finger-wheels and a knurled metal roller 266 reduced at both ends as at 267 to drop into open slots in the carriage ends and pressed against the face of the roller 264 by flat springs 268 at each end.

A paper-deflector 269 curved into a scroll is secured to the under face of the front carriage frame 240, and a shorter deflector 270 may be secured to the latter, as shown in Figure 20, to form a paper-guide element to the scroll below. Camming rods 271 having flattened ends to underlie the reduced ends of the roller 266 take bearings within lugs in each carriage end with upturnd finger-pieces 272. A paper-table 273 secured at the rear to brackets 273ª tends to guide the work-sheet between the lug 235 and the anvil 238. To insert a work-sheet, the finger-pieces 272 are turned to a horizontal position, which movement causes the roller 266 to rise and leave an open gap between it and the roller 264. The work-sheet is laid upon the paper-table and passed under the anvil 238 and forced through the gap between the two rollers 266 and 264. Thence said work-sheet will follow the deflector 269 and roll up in a scroll within. When the paper edge is adjusted for the first line of print, the finger-pieces 272 are raised to a vertical position to restore the roller 266. Said roller will then bear against the upper face of the work-sheet under spring tension, and both rollers will become paper feeding elements in a line-spacing direction. To promote a manual feeding of the work-sheet, the shaft 265 carries a gear 274 outside the right-hand carriage end that meshes with a pinion 275 on the reduced end 267 of the roller 266. This provides for a positive feed for the two rollers 266 and 264 which is more efficient for the heavy grade of work-sheet usually employed in a Braille machine than where frictional contact is employed to rotate the feed roller as in the typewriting machine.

For line-spacing the work-sheet, the shaft 265 at the left-hand end carries a line-spacing wheel 276 and a detent-wheel 277 that coacts with a detent-roller 278 carried by a spring arm 279 secured to the carriage end. The wheel 276 is provided with a pawl 280 pivoted to a slide-bar 281 that is guided by slots formed in a pair of spaced ears 282 and restored by a spring 283 secured between a stud on the slide and a stud on the frame. The pawl 280 has a cam face 284 to engage with a pin 285 to raise the pawl out of engagement with the wheel 276 at the end of the return stroke, and a flat spring 286 secured to the frame to bear downwardly against the end of the pawl to force the pawl into engagement with the wheel 276 at the initial movement of the slide 281.

The slide 281 at the rear end is bent at right angles and carries a stud 287 on the under face to be operated by one arm 288 of a bell-crank pivoted to the frame. The other arm 289 of the bell-crank is pivotally connected to a movable rack-bar 290 suspended from brackets 291 at each end of the carriage through screws 292 engaging slots in horizontal feet 293 set in the face of the bar 290. This rack-bar 290 meshes with a pinion 294 mounted to turn freely upon a drive shaft 295 of an electric motor 296. The pinion has a single clutch tooth that may be moved or shifted into locking engagement with a collar 297 fixed to the shaft 295. The pinion is also provided with a flange portion 298 to house a roller 299 mounted upon one end of a crank-arm 300 secured to the inner end of a shaft 301, having suitable bearings in the frame, and projects beyond the right-hand side of the frame where a crank-arm 302 is secured with the end thereof pivotally connected with a long connecting link 303 that extends forwardly where the front end rides upon a guide-screw 304 (Figure 22) passing through a slot in the connecting link. The free end of said connecting link is turned upwardly at right angles and is pivoted to an arm 305 of a bell-crank 306, which in turn is pivoted to the Braille frame, the upper arm 305ª being provided with a cam face 307 positioned to intercept a stud 308 projecting from the face of the middle lug 241. As shown at Figure 22, the two clutch elements between the pinion 294 and the collar 297 are in locking engagement, and hence the drive shaft 295 rotated by the motor in the direction of the arrow will draw the bar 290 and the carriage to the right for a new line of print. At a predetermined point in this return movement, the stud 308 will engage with the cam 307, thus vibrating the bell-crank 306 and imparting a forward movement to the link 303 to rock the shaft 301 and cause the roller 299 to bear against the flange 298. The pinion 294 will then be withdrawn from its interlock with the collar 297 and continued movement of the carriage to the right will be arrested by the usual margin stop (not shown).

Simultaneously with the longitudinal movement of the bar 290, the resistance of the line-spacing elements being less than the resistance of the carriage spring, the initial movement of said bar will vibrate the crank 289 to draw the slide 281 rearwardly and force the pawl 280 into engagement with the line-spacing wheel 276, causing a partial rotation of the latter. The detent-roller 278 will complete the movement through the round-nosed teeth of the detent-wheel 277 and the free longitudinal initial movement of the bar will be limited by the slots in the feet 293 engaging with the screws 292 (Figure 21).

The motor is controlled from a switch box 309 containing two contacts (Figure 26), a stationary contact 310 and a movable contact 311, that close the circuit to the motor. The movable contact 311 is controlled by a slide-bar 312 (Figures 20 and 26) that takes an end bearing within the box 309, and has a flexible slot connection 313. The slide-bar 312 and flexible slot connection 313 control the contact arm 311, and the opposite end of said slide-bar is pivoted to a crank-arm 314, keyed to a rock-shaft 315 which extends across the machine and takes bearing in the Braille side frames. The shaft 315, outside the frame, carries a second crank-arm 316 with the lower end pivoted to a horizontal bar 317 that passes forwardly through a guide-plate 318, where the free end carries a gravity tripping pawl 319 operative by an arm 320, forming part of a carriage-return key 321 pivoted at 322 to the side frame. The bar 317 has a notch 317ª on its lower edge that interlocks with the guide-plate 318 under spring tension towards the rear of the machine. Hence when the key 321 is depressed, the arm 320 will engage with the pawl 319 to lift the forward end of the bar 317, thus breaking the interlock between the notch 317ª and guide-plate 318. A spring 323 will draw said bar rearwardly to rock the shaft 315 and cause the movable contact 311 to engage the contact 310 and close the motor circuit. The right-hand end of the shaft 315 carries a crank-arm 324 (Figure 22) connected by a link 325 to a crank-arm 326, similar to crank-arm 302 fixed to the shaft 301 on the inside of the frame. And hence, when the key 321 is depressed simultaneously with the closing of the switch 310 and 311, the rock-shaft will convey motion to the shaft 301, shifting the pinion 294 to interlock with the collar 297 which will impart motion to said pinion. The rotation of said pinion will draw the rack-bar 290 and the carriage to the right and simultaneously line-space the work-sheet. As the carriage approaches a right-hand margin stop (not shown), the stud 308 engages the cam 307 to withdraw the pinion 294 from its interlock with the driving collar 297, as above explained, and, through the motion imparted to the rock-shaft 315, the crank-arm 314 will draw the bar 312 forwardly and the movable contact 311 will open the circuit and cut out the motor. This motor control is similar to that shown and described in our co-pending application, No. 41,507, filed July 6, 1925 (now Patent No. 1,679,727, dated August 7, 1928).

A novel arrangement, that co-operates with the motor control just described, provides means to lock the carriage-return mechanism in operative position, and comprises a cam 327 (Figure 22) connected to a lever 328 by a sleeve that has a bearing upon a screw 329 threaded into the frame. A two-way spring 330ª has one end attached to a stud 330 on said cam 327, and the other end anchored to an eye bolt 331 fixed to the base. The two-way spring will be effective on either side of screw 329, causing the lever 328 to be urged against stop members 332 at both upper and lower positions. In the raised position of the lever 328, shown in full lines, the carriage-return mechanism is automatically operative. In the depressed position of said lever, shown in dotted lines, the cam 327 will engage with the link 303, forcing it forwardly and holding the associated parts of the carriage-returning mechanism in inoperative positions.

The carriage return just described refers to a local manipulation of the Braille keyboard, and when the Braille machine is automatically operated from the typewriter keyboard, connections between the two machines must be established. The carriage-return key 194ª on the typewriter transmits an electric impulse through a line circuit that must be utilized by the Braille machine to perform functions similar to the manual depressions of the key 321. Referring to Figure 20, an electromagnet 333 is supported by a bracket 334 fixed to the inside front wall of the casing and is formed with a turned-up arm to give a pivotal bearing to an armature lever 335. A spring 336 is attached to one end of said lever and forces the other end of the lever against the top wall of the base for a stop position. The end of the lever 335 adjacent the spring underlies an arm 337 which is secured to the bar 317, the lower end of said bar being bent at right angles to form a wide shoe for engagement with lever 335. The impulse transmitted by the key 194ª on the typewriter energizes the magnet 333, and the armature lever 335 controlled thereby will co-act with arm 337 to raise the bar 317 from its interlock with the plate 318, and, through the intermediate connections, the switch comprising contacts 310 and 311 will be closed, thus rendering the motor 296 active to move the carriage to the right, as previously described, for the operation of the key 321.

Referring to Figures 20, 24 and 25, a transverse bar 338 extends across the lower edge of the base frame and is secured to lugs thereon by screws 338ª, and on the upper face thereof are arranged a series of seven electromagnets or solenoids, six of them 339, 339ª to 339ᵉ for the six keys 225, 225ª to 225ᵉ, and the seventh solenoid 340 for the space-key 226. These solenoids have a hollow rectangular core to receive armatures 341, provided with upstanding forked members 342 closed at their ends by a spacing stud 343. Each lever 225 and the space-key 226 passes under the stud of its associated armature, and hence, when a solenoid is energized and its armature drawn downwardly within the solenoid, the levers will be depressed to operate their connected push pins 234 similar to a manual manipulation of the keys. The interval that these solenoids are active is determined by the interval that the rocker contacts 102 and 103 in the typewriter base are active during the downward swing of the tripping pawl 85.

Referring to Figures 20 and 25, a bar of insulation 344 is suspended in a horizontal position immediately in front of the solenoids 339 by a bracket 345 fixed at each end to the inner front wall of the base. This bar carries a series of binding posts for convenient circuit connections. One wire terminal of all seven solenoids passes below the bar 344 to individual binding posts 346 extending through the bar. The upper ends of the binding posts 346 have individual circuit connections to a distributing plug 347. The other terminal of these solenoids passes to binding screws 348 on the under side of the bar 344, that are connected on the upper side by a plate 349, one terminal of said plate being connected to a wire 350 leading to a Vitrohm resistance coil 351 secured between the two brackets 345. The other terminal of the plate 349 is offset at 352 for purposes presently to be described. 353 indicates binders for two circuits passing from the lower ends through the cable to a plug 354 that nests with the other half of a plug 354ª of the switch box 309. The upper ends of the binders 353 have independent circuits to the distributing plug 347.

On the under surface of the bar 344, a plate 355 is secured thereto having a binder 356 connected in circuit with the plug 347. The upper end of binder 356 receives a terminal 357 leading to the Vitrohm coil 351. The plate 355 has two holes registering with tapped holes 358ª and 358ᵈ in the bar 344, through either one of which a screw 358 may be threaded. When threaded through the former hole, the plate is inoperative as a conductor and when threaded through the latter, the screw contacts with the offset end 352, and the plate 355 becomes a conductor between the binder 356 on the under side of the bar 344 and the plate 349 on the top side. When the screw 358 is set, as shown in Figure 25, the incoming current passes from the binder 356 through the leading end wire 357 to the Vitrohm resistance, and thence through the terminal 350 to the plate 349. This provides for a resistance that is thrown into the circuit when a direct current is employed to operate the motor and solenoids. When an alternating current is employed, the screw 358 acts to throw plate 355 into the circuit between the plate 349 and binder 356, and accordingly shunts or cuts out the Vitrohm resistance.

When it is desired to use the Braille writer separately, the plug 354 is removed and a separate plug may be connected directly to an electric light circuit for the purpose of operating the line-spacing carriage-return elements.

As the Braille machine is operated by blind persons, the approch of the end of the line of print is indicated by a gravity pawl 359 operated by a tripping member 360 on the carriage to strike a bell 361 secured to the frame, indicating that only a predetermined number of characters can be printed beyond that point (see Figure 20).

A cable 362 that carries the eleven circuits has terminal plugs 363 that nest with the distributing plugs 224 and 347 of the two machines, and it will be noted that the diagrams of the holes in the two plugs (Figure 31) are the same. This feature allows either end of the cable to be interchanged, and the holes are so relatively positioned as to prevent the nesting of the two members except at a fixed position, thus preventing any possibility of the circuits becoming crossed in the adjustment of the cable connecting the two machines.

At Figure 31, a diagrammatic layout of all circuits is shown, and the several machine parts are marked for identification. Thus the current entering from an electric light circuit to the plug 223 passes through one circuit to the distributing plug 224, and the other circuit passes through the switch contact elements 219 and 220 through a circuit common to all the contact springs 75, and thence to the plug 224, thus providing a separate circuit through the springs 201 to the motor circuit. The other circuits from the springs pass to individual terminals in the plug and become operative upon closing the contacts 102 and 103, thereby completing the main line circuit from the plug 223. Similarly, the receiving distributing plug 347 provides leading out wires that connect the different parts to maintain synchromism between the two machines. For example, when the current is transmitted through the two springs 75ᵉ by the depression of the bail 69ᵉ, the impulse will energize the solenoid 339ᵉ to operate the key-lever 225ᵉ, forcing the pin 234ᵉ to register a raised character in the lower right-hand corner of the Braille six-point unit, indicating in the Braille system that the following letter is a capital.

From this description it will be seen that the two machines are employed to write in synchronism upon two different work-sheets in two different and distinct languages; that one machine automatically translates printed characters that can be read by the eye into the equivalents that can be read both by the eye and by the fingers; that each machine may be severed from the other and operated independently; that the distance between the two machines is limited only by the length of the cable that joins them together; that a person not familiar with the Braille system can transcribe a letter to a person who is familiar with said system; that a blind person can manipulate the typewriter and read what has been written from the Braille translation printed simultaneously; that the manipulation of one machine producing an ink-record on one work-sheet simultaneously produces an equivalent uninked record that can be read by the eye and the fingers; that the manipulation of the machine having standard letter-spacing dimensions, automatically operates the other machine having letter-spacing dimensions of greater extent; that with a standard motor in the circuit adapted to an alternating current, by a simple adjustment, a direct current may be employed; and that a standard typewriting machine can be employed without any change in existing parts except to provide new rubber feet.

Variations may be resorted to within the scope of the invention, and portions of the improvements may be used without others.

Having thus described our invention, we claim:

1. Means for automatically operating an embossing typewriter for the blind from a standard typewriting machine, including a main line circuit and a series of independent circuits arranged in parallel, each of said independent circuits operating a single embossing key-lever, means controlled by each typewriter-key for closing different combinations of said circuits, and a main line switch actuated by said closing means for closing the main circuit, thereby energizing the parallel circuits to operate said embossing key-levers.

2. In a typewriting machine having type-keys and auxiliary manual control-means and operatively connected with an embossing machine having a plurality of control-means and operative members, the combination with an electric circuit associated with each of said embossing machine control-means and members, of a main switch controlling said circuits for energizing the same, a movable lever associated with said typewriting machine in such manner as to be depressible by said keys and arranged to close said main switch when depressed, and a plurality of distinct depressible means also associated with said typewriter-keys and auxiliary control-means in such manner as to be operable thereby to move said lever and thereby variously close said circuits in order to correspondingly control and operate said embossing machine simultaneously with the operation of said typewriting machine.

3. Means for automatically operating an embossing typewriter for the blind from a standard typewriting machine, including a main line circuit and a series of independent circuits arranged in parallel, each of said independent circuits operating a single embossing key-lever, spring-controlled displaceable means operated by each typewriter-key, circuit-closing means actuated by said displaceable means to close different combinations of said parallel circuits, and a main line switch actuated by said parallel circuit-closing means for closing the main circuit, thereby energizing the independent parallel circuits to operate the key-levers.

4. In combination with a typewriting machine and an embossing typewriter for the blind type-operatively connected therewith, an electromagnet for operating each embossing unit, independent circuits for energizing said electromagnets, means actuated by each typewriter-key to close certain of said circuits, a main line circuit for supplying current to said independent circuits, and a main line switch simultaneously operated to close the main circuit, whereby operation of a typewriter-key will actuate certain of the embossing units to produce a character equivalent to the typed character.

5. In a combined typewriting machine and an embossing blind writer operatively connected therewith, a base for supporting the typewriting machine, key-levers on the typewriter, a cross-bar rigid with said base, a carrier having top and bottom comb-guides mounted on said cross-bar, vertically-disposed push-bars or plungers supported by said comb-guides and actuated by the typewriter key-levers by impingement of the same upon said plungers, and means for displacing the comb-guides and said push-bars or plungers to an inoperative position by increasing the distance between said plungers and guides and said key-levers.

6. In a combined typewriting machine and an embossing blind writer operatively connected therewith, a base for supporting the typewriting machine, a cross-bar rigid with said base, a carrier having top and bottom comb-guides mounted for vertical sliding movement on said cross-bar, vertically-disposed push-bars or plungers supported by said comb-guides and actuated by the typewriter-keys, and means for displacing the comb-guides and said push-bars or plungers to an inoperative position, said displacing means including pinions engaging rack teeth on the face of the carrier and a finger-wheel for actuating the pinions.

7. In a combined typewriting machine and an embossing blind writer operatively connected therewith, a base for supporting the typewriting machine, key-levers on the typewriter, a cross-bar rigid with said base, a carrier having top and bottom comb-guides mounted on said cross-bar, vertically-disposed push-bars or plungers supported by said comb-guides arranged adjacent and actuated by the typewriter key-levers impinging on the same, means for separating the comb-guides and plungers from said key-levers, and means on said carrier co-acting with the cross-bar for limiting the movement of the former to its inoperative position.

8. In combination, electric circuits, each circuit controlling a single point of the Braille system of notation, a typewriting machine having key-levers, a supporting base therefor, a cross-bar rigid with said base, top and bottom comb-guides mounted on the cross-bar, and a series of vertically-disposed slidable plungers mounted for up-and-down movement in said comb-guides to dispose one plunger beneath each key-lever, there being means actuated by each plunger to close one or more of said circuits.

9. Means for automatically operating an embossing typewriter for the blind from a typewriting machine, including electromagnets for operating the embossing keys, each electromagnet being controlled by an independent electric circuit, the terminals of which are in spaced relation and banked on an insulating bar mounted in a base for supporting the typewriting machine, means controlled by the operating keys of the typewriting machine for closing a predetermined number of circuits across the terminals, a main line circuit for supplying current to the independent circuits, and means operated by said circuit-closing means for simultaneously closing the main line circuit.

10. In a typewriting machine having key-levers and an embossing machine operatively connected therewith, the combination with embossing members on the latter machine, of a group of similar circuits arranged to individually actuate said embossing members, a depressible bail for each embossing member arranged when moved to close the associated circuit, a displaceably-mounted support-member associated with said typewriting machine, means to variously operate said bails and corresponding embossing members including a plurality of independently and vertically movable members supported on said support-member intermediate the key-levers and bails so as to provide one intermediate member for each key-lever, and means to displace said support-member to idle position whereby to bodily separate all said vertically-movable members from said key-levers and remove the same beyond the range of movement.

11. In a combined typewriting machine and an embossing machine for the blind operatively connected therewith, there being key-levers on the first machine and embossing levers on the second, the combination with a series of independent, movably-mounted members, and means for operating each embossing key, of a carrier having top and bottom comb-guides mounted above said movable members, a second series of independent members slidably mounted in said comb-guides to move said first members, and means for displacing the carrier and the second series of members carried thereby to space the latter away from the typewriter-keys.

12. In a combined typewriting machine and an embossing machine for the blind operatively connected therewith, the combination with a series of rockably mounted bails, each controlling an embossing key, of a transversely-extending carrier having top and bottom comb-guides mounted for vertical movement, typewriter-key-operated means slidably mounted in the comb-guides to rock the bails, and means for displacing the carrier and the bail-rocking means carried thereby to remove the latter from the influence of the typewriter-keys, said last-mentioned means including a shaft, pinions keyed to said shaft and engaging rack-teeth on the carrier, and a finger-wheel mounted on the shaft for rotating the pinions.

13. In a typewriting machine and an embossing blind writer operatively connected therewith, the latter having operating keys for embossing raised pin-point characters on a work-sheet, the combination with means for actuating said keys, said means including an independent circuit for each key, the terminals thereof being conducted to an insulating bar in a base upon which the typewriting machine is mounted, of means in said base actuated by the depression of the typewriter-keys for closing certain of said circuits, and means simultaneously actuated by said last-mentioned means for closing a main line circuit supplying current to said first-mentioned circuits, so that upon depression of any typewriter-key certain of said embossing keys will be electrically operated to emboss a pin-point character equivalent to the depressed typewriter-key.

14. The combination with a typewriting machine having the usual space-bar levers, of an embossing blind writer operatively connected with the typewriting machine, a main line circuit and a secondary circuit in parallel therewith, said secondary circuit arranged to operate the space-key of the embossing machine, means carried by one of said space-bar levers to close the secondary circuit, and means operated by the other space-bar lever to simultaneously close the main line circuit.

15. The combination with a typewriting machine having the usual space-bar levers, of an embossing blind writer operatively connected with the typewriting machine, a main line circuit and a secondary circuit in parallel therewith, said secondary circuit arranged to operate the space-key of the embossing machine, the terminals of the secondary circuit being disposed adjacent a spring-controlled contact roller, a push-bar mounted for upand-down movement within a fixed bracket and actuated by one of the space-bar levers to urge the contact roller against the terminals of the secondary circuit, and means actuated by the other space-bar lever to close the main line circuit, whereby the secondary circuit will be energized to operate the embossing space-key.

16. The combination with a typewriting machine having the usual space-bar levers, of an embossing blind writer operatively connected with the typewriting machine, a main line circuit and a secondary circuit in parallel therewith, said secondary circuit arranged to operate the space-key of the embossing machine, the terminals of the secondary circuit being disposed adjacent a spring-controlled contact roller, a push-bar mounted for up-and-down movement within a fixed bracket and actuated by one of the space-bar levers to urge the contact roller against the terminals of the secondary circuit, and means actuated by the other space-bar lever to close the main line circuit, whereby the secondary circuit will be energized to operate the embossing space-key, said means including a second vertically-disposed push-bar, a pivoted lever actuated thereby, a spring-controlled tripping pawl pivoted on said last-mentioned lever, and a rocker member, having contact points to engage the main line terminals, actuated by said tripping pawl.

17. Means for automatically operating an embossing machine for the blind from a typewriting machine, including a main line circuit and a series of secondary circuits arranged in parallel, each of said secondary circuits arranged to operate an embossing key to produce a pin-point character of the Braille system of notation, means actuated by each typewriter-key to close a predetermined combination of said secondary circuits to operate associated embossing keys, thus producing a pin-point character equivalent to the manually-operated typewriter-key, and means actuated simultaneously with the closing of the secondary circuits to close the main line circuit.

18. Means for automatically operating an embossing blind writer from a typewriting machine, including a main line circuit and a secondary circuit in parallel therewith, said secondary circuit arranged to operate the spacing key of the blind writer, and means carried by the space-bar levers of the typewriting machine to simultaneously close the secondary and main line circuits, so that upon actuation of the typewriter space-bar there will be a corresponding letter-spacing feed in the blind writer.

19. The combination with a typewriting machine mounted upon a base, of a blind writer operatively connected therewith, a main line circuit having several secondary circuits arranged in parallel, each controlling a blind-writer operating key, means in the base actuated by each typewriter-key to close the secondary circuits, means for simultaneously closing the main line circuit, and means for connecting a source of current to the base.

20. The combination with a typewriting machine mounted upon a base, of a blind writer operatively connected therewith, a main line circuit having several secondary circuits arranged in parallel, each controlling a blind-writer operating key, means in the base actuated by each typewriter-key to close the secondary circuits, and a circuit-maker in the main line circuit controlled by the secondary circuit-closing means to complete the circuit through the latter, whereby the blind-writer keys will be operated.

21. The combination with a typewriting machine mounted upon a base, of a blind writer operatively connected therewith, a main line circuit having several secondary circuits arranged in parallel, each controlling a blind-writer operating key, a hinged bail for each secondary circuit controlled by the typewriter-keys, a contact roller carried by each bail and insulated therefrom, a pivoted universal bar controlled by each of said bails, and a circuit-maker in the main line circuit controlled by the universal bar, so that actuation of the bails by manual operation of the typewriter-keys will cause the contact rollers to close the secondary circuits and the universal bar to actuate the circuit-maker in the main line circuit to operate the blind-writer keys.

22. The combination with a typewriting machine mounted on a base, of an embossing typewriter for the blind operatively connected therewith, a main line circuit having several secondary circuits arranged in parallel, each controlling an embossing key, means actuated by each typewriter-key to close the secondary circuits, and means for simultaneously closing the main line circuit, said last-mentioned means including a bracket supported within the base, a rocker mounted centrally in said bracket, contact points on each end and on opposite sides of said rocker arranged to contact with main line terminals, spring means for normally maintaining the contact points of the rocker away from the main line terminals, and means actuated by the secondary circuit-closing means to swing the rocker against the action of said spring means to close the main line circuit.

23. The combination with a typewriting machine mounted on a base, of an embossing typewriter for the blind, a main line circuit having several secondary circuits arranged in parallel, each controlling an embossing key, contact rollers carried by pivotally-mounted bails in said base and actuated by the typewriter-keys to close the secondary circuits, a universal bar disposed below the bails and urged downwardly thereby upon operation of the typewriter-keys, said bar, having a lateral projection, arranged to swing a pivotally-mounted lever, and means engaged by said lever to close the main line circuit.

24. The combination with a typewriting machine mounted on a base, of an embossing typewriter for the blind, a main line circuit having several secondary circuits arranged in parallel, each controlling an embossing key, contact rollers carried by pivotally-mounted bails in said base and actuated by the typewriter-keys to close the secondary circuits, a pivoted universal bar disposed below the bails and urged downwardly thereby upon operation of the typewriter-keys, the free end of the universal bar having a lateral projection and arranged to swing a pivotally-mounted spring-controlled lever, a tripping pawl pivotally mounted on one arm of said lever, a spring, one end thereof being anchored to said pawl and the other end to the second arm of said lever, urging the tripping pawl against a stop integral with the first-mentioned arm of the lever, and means actuated by said tripping pawl to close the main line circuit, whereby the secondary circuits will be energized to operate the embossing keys associated therewith.

25. The combination with a typewriting machine mounted on a base, of an embossing typewriter for the blind, a main line circuit having several secondary circuits arranged in parallel, each controlling an embossing key, contact rollers carried by pivotally-mounted bails in said base and actuated by the typewriter-keys to close the secondary circuits, a pivoted universal bar disposed below the bails and urged downwardly thereby upon operation of the typewriter-keys, the free end of the universal bar having a lateral projection and arranged to swing a pivotally-mounted spring-controlled lever, a tripping pawl pivotally mounted on one arm of said lever, a spring, one end thereof being anchored to said pawl and the other end to the second arm of said lever, urging the tripping pawl against a stop integral with the first-mentioned arm of the lever, and means actuated by said tripping pawl to close the main line circuit, whereby the secondary circuits will be energized to operate the embossing keys associated therewith, said circuit-closing means including a rocker pivoted centrally thereof, contact points on each end and on opposite sides of said rocker, main line contact points arranged adjacent the rocker contact points, spring means for normally maintaining the rocker contact points against a stop and away from the main line contact points, and a shelf-portion integral with the rocker extending into the path of the tripping pawl, so that, upon actuation of the bail-operated universal bar, the tripping pawl will engage the shelf-portion to swing the contact points of the rocker into engagement with the main line contact points.

26. In a typewriting machine having type-keys, a platen and a shift-key, and operatively connected with an embossing machine provided with embossing members, the combination with a base for said typewriting machine having a shifting carrier provided with a plurality of rockable bails corresponding with said embossing members and shiftable with the carrier, of independently-mounted vertically-movable members individually associated with said typewriter-keys and with said bails so as to be movable by said keys in order to variously operate said bails and thereby emboss characters on said embossing machine corresponding with lower-case characters simultaneously typed by said type-keys, there being means associated with said shift-key for shifting said carrier and bails relatively to said key-operated vertically-movable members upon depression of said shift-key and shifting of said platen to upper-case position, and means upon said bails so arranged relatively to said independently-mounted means that the latter will co-operate with said bail-members in the same manner in normal or in shift position of said carrier and bails in order to emboss the same normal Braille alphabet-characters on said embossing machine while the typewriter-platen is arranged for typing lower-case characters or when shifted for typing of the corresponding upper-case characters.

27. In a typewriting machine having type-keys, a platen and a shift-key and operatively connected with an embossing machine having embossing members, the combination with a plurality of rocking bails corresponding with, and associated with, said embossing members and shiftable together from a common normal to a common shifted position, of independently-mounted vertically-movable means individually associated with said type-keys and with said bails so as to be movable by said keys for variously operating said bails to thereby emboss Braille characters on said embossing machine corresponding with lower-case characters simultaneously typed on said typewriting machine, there being means associated with said shift-key for shifting all said bails to shifted position with respect to said independently-mounted means upon depression of said shift-key and shifting of the platen to upper-case position, and means upon said bails including variously-spaced teeth of various widths so relatively disposed and proportioned with respect to said independently-mounted means that the latter will co-operate in the same normal manner therewith in normal or shifted position of said bails in order to emboss the same normal Braille alphabet-characters on said embossing machine when the typewriter-platen is arranged for typing of lower-case alphabet-characters or shifted for typing of the corresponding upper-case characters.

28. In a typewriting machine having type-keys and a case-shift key, and operatively connected with an embossing machine having embossing members, the combination of means operable by the typewriter-keys to actuate the embossing members to produce pin-point characters equivalent thereto, said means including a hinged bail for each embossing member and a series of independent, slidable typewriter-key-operated push-bars for rocking said bails, a carrier having a shaft shiftable therewith for supporting the bails, means for slidably mounting said carrier, said last-mentioned means including anti-friction rollers bearing against both upper and lower faces of the carrier, studs engaging slot-portions in the carrier for limiting the travel of the carrier, and means controlled by the case-shift key of the typewriter for shifting the carrier, the bails being similarly shifted relatively to the bail-operating push-bars, there being spring means for returning the carrier and bails to normal position.

29. In a typewriting machine having type-keys and a case-shift key, and operatively connected with an embossing machine provided with embossing members, the combination of means operable by the typewriter-keys for operating the embossing members to produce pin-point characters equivalent thereto, said means including a hinged bail for each embossing member and a series of independently-mounted, slidable typewriter-key-operated push-bars for rocking said bails, a shiftable carrier provided with a shaft movable therewith for supporting the bails, means for slidably mounting said carrier, said last-mentioned means including a subcarriage having anti-friction rollers bearing against both upper and lower faces of the carrier, stationary studs engaging slot-portions in the carrier for limiting the travel of the carrier, and means operable by the case-shift key of the typewriter for shifting the carrier and displacing the bails relatively to the typewriter-keys, said carrier-shifting means including a lever having an arm engaging the carrier and a shoe-portion engaged by a link operated by the case-shift key, so that, upon actuation of the shift-key, the lever will rock to shift the carrier, there being spring means attached to the arm of the lever for returning said lever to normal position.

30. In a combined embossing machine for the blind and a type-and-shift-key equipped typewriter operatively connected therewith having means for operating the embossing machine to produce embossed characters including pivoted bails and means operable by the type-keys for rocking said bails, a shiftable carrier having a shaft movable therewith for supporting the bails, means for slidably mounting said carrier including a rigid subcarrier provided with anti-friction rollers bearing against both upper and lower faces of the carrier, stationary studs engaging slot-portions in the carrier for limiting the travel of the carrier, and means operable by the case-shift key of the typewriter for shifting the carrier, thus displacing the bails relatively to the typewriter-keys, said carrier-shifting means including a lever having an arm engaging the carrier and a shoe-portion engaged by a link operated by the case-shift key, so that, upon actuation of the shift-key, the lever will rock to shift the carrier, there being spring means attached to the arm of the lever for returning said lever to normal position, there being also spring means for returning the carrier to normal position upon release of the shift-key.

31. In a typewriting machine having key-banks and operatively connected with an embossing machine having a plurality of embossing members, there being means variously operable by said type-keys including rockable bails corresponding with said embossing members for individually operating the embossing members to emboss characters equivalent to the typed characters without distinction between letters and numerals, and means operative from the typewriting machine to emboss a multi-point character including an auxiliary key associated with said key-banks and arranged to operate a limited successive number of the same bails whereby to operate a corresponding limited group of said embossing members.

32. In a typewriting machine having banks of type-keys and operatively connected with an embossing machine provided with a plurality of embossing members, there being means operable by said type-keys including rockable bails corresponding with said embossing members for individually controlling the operation thereof in order to emboss multi-point characters equivalent to simultaneously typed characters without distinction between letters and numbers, the combination with a normal type-key in said banks arranged to rock a limited group of said bails whereby to operate a corresponding group among said embossing members for embossing a regular multi-point character, of an auxiliary key disposed in proximate association with said banks and arranged to operate the same limited group of bails whereby to control the same corresponding group of embossing members in order to emboss the same multi-point character, at will, for the purpose of designating a following character as a numeral.

33. In a typewriting machine having both a bank of type-keys and a support, and operatively connected with a Braille embossing machine provided with six embossing members, the combination with means operable by said type-keys to emboss point-characters through various combinations of said embossing members without distinction between letters and numerals, including individual control-members for actuating said embossing members, one of said type-keys operating four of said control-members and thereby actuating four corresponding embossing members to produce a four-point character corresponding with a typed character, and an auxiliary key associated with said support and disposed in relative association with said type-key bank to form a normal member thereof and provided with means to operate the same four control-members and thereby said four embossing members in order to produce the same four-point character as produced from said type-key, said four-point character when produced in said manner from said auxiliary key forming a prefix to identify following characters as numerals.

34. In a typewriting machine having a bank of type-keys and a case-shift key, and operatively connected with a Braille embossing machine provided with six embossing members, the combination of means operable by said type-keys to emboss point characters through various combinations of said embossing members without distinction between upper and lower case letters, one of said type-keys operating one of said embossing members to produce a one-point character corresponding with a typed character, and means operable by said case-shift key to actuate the same embossing member to produce the same one-point character to form an upper-case prefix before a point character to identify it as an upper-case characater.

35. In a typewriting machine having a plurality of type-keys and a case-shift key, and operatively connected with an embossing machine provided with six embossing members, the combination of a base for said first machine including means operable by said type-keys to produce point characters corresponding with typed characters through various combinations of said embossing members without distinction between small and capital letters, and auxiliary means on said base operable by said case-shift key to actuate the same embossing member to produce the same one-point character to form a prefix to identify a following character as a capital, the typewriter being simultaneously conditioned to type capital letters.

36. In a typewriting machine having a shiftable platen, a bank of type-keys and a case-shift key, and operatively connected with an embossing machine provided with six embossing members, the combination of means operable by said type-keys to produce embossed characters through various combinations of said embossing members including a base for said typewriting machine containing pivoted bails, each associated with one embossing member, one of said bails being operable by one of said type-keys to produce a one-point character through one of said embossing members, and means on said base operable by said case-shift key to actuate the same bail and embossing member in order to produce the same one-point character to form a prefix to identify the following character as a capital letter, the typewriter-platen being simultaneously raised to upper-case position.

37. In a combined typewriting machine and an embossing machine for the blind, a base for supporting the typewriting machine and for housing a series of nested pivoted bails, said bails being controlled by the typewriter-keys for operating the embossing keys to produce pin-point characters equivalent to the typed characters, said pin-point characters making no distinction between small letters and capital letters, and means actuated by the typewriter case-shift key, in shifting the typewriter-platen to upper-case position, for controlling the operation of a single bail, thus producing a single pin-point character to designate the following character as a capital, said means including a slide member mounted for vertical up-and-down movement and having a roller at its upper end for engagement with the case-shift key, a spring-pressed pawl for actuating a single bail, and means for tripping said pawl before the end of the down stroke of the slide member to release the bail.

38. In a combined typewriting machine and an embossing machine for the blind, a base for supporting the typewriting machine and for housing a series of nested pivoted bails, said bails being controlled by the typewriter-keys for operating the embossing keys to produce pin-point characters equivalent to the typed characters, said pin-point characters making no distinction between small letters and capital letters, and means actuated by the typewriter case-shift key, in shifting the typewriter-platen to upper-case position, for controlling the operation of a single bail, thus producing a single pin-point character to designate the following character as a capital, said means including a slide member mounted for vertical up-and-down movement and having a roller at its upper end for engagement with the case-shift key, a pawl pivoted to a lug projecting from an edge of the slide member, a spring for urging said pawl against a pin fixed to the slide member, and means for tripping the pawl after actuating a single bail to operate a single embossing key.

39. In a typewriting machine having type-keys and operatively connected with an embossing machine for the blind, provided with a traveling carriage and a motor-operated carriage-return mechanism, the combination with a motor-control-switch for said carriage-return-mechanism, of a carriage-return control-lever associated with said typewriting machine, a normally open main-line circuit for said motor, a solenoid-circuit for closing said motor-control-switch, means for closing both of said circuits including a circuit-closer in said main-line circuit operable by said control-lever for initially closing the main circuit of said motor, and a second circuit-closer operable by said control-lever to close the solenoid-circuit for operating said motor-control switch whereby to operate said motor and carriage-return mechanism.

40. In a typewriting machine having typekeys and operatively connected with an embossing machine for the blind, provided with a traveling carriage and a motor-operated carriage-return mechanism, the combination with a motor-control-switch for said carry-return-mechanism, of a carriage-return-lever on the typewriting machine, operable to automatically control said control-switch, means to control and energize said motor including parallel circuits so arranged that one circuit is connected to said motor and is closable by said motor-control-switch, an electromagnet controlling the operation of said motor-control-switch and connected with the other parallel circuit, and means operable by said control-lever for controlling said second parallel circuit in order to operate said motor-control-switch, there being a common current-source for both said circuits.

41. The combination with a typewriting machine, of a base for housing means controlled by the typewriter-keys for operating embossing mechanism of a blind writer, said blind writer having a traveling carriage, motor-operated carriage-return mechanism, the motor having a control switch, a main line circuit for energizing said motor, a parallel circuit for operating said control switch, and means for simultaneously closing both of said circuits, said last-mentioned means including a rock-shaft journaled in said typewriter-base, an insulated contact roller for the main circuit supported in a bracket keyed to said shaft, a lug in said bracket for controlling a rocker switch for closing the parallel circuit, a crank-arm fixed to the rockshaft, and a key-lever for operating said crank-arm to rock the shaft, whereby the contact roller will close the main circuit and the rocker switch will simultaneously close the parallel circuit to close the motor-control switch.

42. In an embossing typewriter for the blind, the combination of a base for housing key-operated embossing means which include a series of electromagnets, the core of each electromagnet being connected to an embossing key-lever, a series of binding posts mounted on a cross-bar of non-conducting material, both terminals of each electromagnet being connected to a pair of binding posts at the under surface of the non-conducting cross-bar, a conducting plate connecting one binding post of each pair at the upper surface of said bar, the other binding post of each pair being connected by terminals of independent parallel circuits, the return of said circuits being connected to the conducting plate, means for initially closing one or more of said circuits to variously operate the embossing means, and means for finally closing and energizing the initially closed circuits.

43. In an embossing typewriter for the blind, a base upon which the typewriter is supported for housing embossing key-operated means, said means including a series of electromagnets, the core of each electromagnet being connected to an embossing key-lever, a main line circuit having a plurality of independent parallel circuits, each operating an electromagnet, and adjusting means in said main line circuit for utilizing either alternating or direct current to operate the electromagnets.

44. In an embossing typewriter for the blind, a base upon which the typewriter is supported for housing embossing key-operated means, said means including a series of electromagnets, the core of each electromagnet being connected to an embossing key-lever, a main line circuit having a plurality of independent parallel circuits, each operating an electromagnet, a Vitrohm resistance coil in parallel with the main line circuit, and means for throwing said resistance into the circuit to utilize a direct current and removing said resistance from the circuit to utilize an alternating current.

45. In a typewriting machine having typekeys and an associated embossing machine provided with embossing members, means for operating said embossing machine from said typewriter including the combination with a main feeder circuit, of a secondary circuit connected in series therewith for individually actuating one embossing member, means operable by one of said type-keys to independently close said secondary circuit, a distinct means also operable from said typekey to independently close the main circuit, and a normally closed safety-switch in said main circuit provided with independent means for opening the same after closing both the main and secondary circuits.

46. In a typewriting machine having typekeys and an associated embossing machine provided with embossing members, means including a main circuit and a group of parallel secondary circuits arranged in series therewith for individually actuating said embossing members, means operable by said type-keys to selectively close various secondary circuits, means also operable from said keys to close the main circuit, a normally closed safety-switch in said main circuit, and manual means operable to electrify all the secondary circuits and the main circuit, and automatically open the safety-switch to open all the circuits to the embossing machine.

47. In a typewriting machine having type-keys and an associated embossing machine provided with embossing members, a main circuit, a secondary circuit in series therewith for individually actuating one embossing member, means operable by one type-key to close the secondary circuit, means also operable from said key to close the main circuit, a normally closed safety-switch in the main circuit, and means to operate the main and secondary circuit-closing means and simultaneously open said safety-switch.

48. In a typewriting machine having type-keys and an associated embossing machine provided with embossing members, a main circuit, a group of parallel circuits for individually actuating said embossing members, means to initially close various members of the secondary circuits, and means to subsequently close and immediately automatically open the main circuit while the secondary circuits remain closed in order to momentarily energize said closed secondary circuits.

49. In a typewriting machine having type-keys and an associated embossing machine provided with embossing members, an electric circuit having a branch circuit for individually actuating each of said embossing members, a contact-means in each branch circuit including a stationary and resilient contact-member, and an arm bearing an insulated bracket, a contact-roller rotatable on said bracket, there being supporting means for said arm operable by said type-keys to move said arm to cause the roller to engage and roll along said stationary contact-member in order to close the associated circuit.

50. In a typewriting machine having type-keys and an associated embossing machine provided with embossing members, means to operate said embossing members from the type-keys including a pivoted lever, independently movable means interposed between said keys and said lever to transmit movements of the keys to the lever, an electric circuit for each embossing lever to actuate the same, and means for closing one or more of said circuits simultaneously including a pivoted switch-member in said circuits to energize the same, and a pivoted arm bearing a pawl disposed beneath said lever to be depressed thereby in order to move said pawl to engagement with said switch-member to close the same.

51. In a typewriting machine having type-keys and an associated embossing machine provided with embossing members, means to operate said embossing members from the type-keys including a pivoted lever, independently movable means interposed between said keys and said lever to transmit movements of the keys to the lever, an electric circuit for each embossing lever to actuate the same, and means for closing one or more of said circuits simultaneously including a pivoted switch-member in said circuits to energize the same, a pivoted arm disposed beneath said lever to be depressible thereby, and a pawl on said arm movable therewith to engage said switch-member to close the same and further movable to pass said switch-member to permit the same to swing open, there being resilient means tending to open said switch-member.

52. In a typewriting machine having type-keys and an associated embossing machine provided with embossing members, in combination, means for individually actuating said embossing members including a group of parallel circuits, a plurality of corresponding pivoted bails provided with means to initially close said circuits in movement, a plurality of independent depressible members intermediate said bails and the type-keys to move the bails, a lever disposed beneath said bails, a main switch closable by said lever to energize the initially-closed circuits, and means to displace said depressible members, said bails and lever beyond the influence of said type-keys and simultaneously close all said circuits and said main switch.

53. In a typewriting machine having type-keys and an associated embossing machine provided with embossing members, in combination, means for individually actuating said embossing members including a group of parallel circuits, a plurality of corresponding pivoted bails provided with means to initially close said circuits in movement, a plurality of independent depressible members intermediate said bails and the type-keys to move the bails, a lever disposed beneath said bails, a main switch closable by said lever to energize the initially-closed circuits, a normally closed safety-switch controlling said circuits, and means to displace said depressible members, bails and lever beyond the influence of said type-keys and simultaneously close all said circuits and said main switch and open said safety-switch.

54. In a typewriting machine having type-keys and a case-shift-key and an associated embossing machine provided with embossing members, a plurality of parallel circuits for individually actuating said embossing members, there being a pivoted bail for each circuit conditioned to close the same with interposed movable members between the type-keys and said bails, one of said type-keys being thus conditioned to depress one bail and to emboss a one-point character corresponding with a typed character, a main switch for energizing the parallel circuits, and means associated with said case-shift-key to depress the same single bail and emboss the same one-point character including a reciprocable member beneath said key bearing a pawl to directly engage and depress said bail and close said switch, a projection on one side of said pawl, and an obstruction spaced beyond said pawl projection to engage the projection and slide said pawl off the bail in movement to permit the bail and switch to return to normal positions while the key remains depressed.

55. In a typewriting machine having key-levers and an embossing machine operatively connected therewith provided with embossing members, the combination with a group of similar circuits to individually actuate said embossing members, there being a pivoted bail for each embossing member conditioned to close the associated circuit, of means to variously operate said bails and thereby said embossing members including a plurality of independent intermediate slidable members supported between said key-levers and bails, providing one such member for each key, there being a stop on each slidable member for limiting the return reciprocation thereof at a normal position, and means to remove said slidable members from their normal position beyond the range of said levers.

56. In a typewriting machine having key-levers and an embossing machine operatively connected therewith, the combination with embossing members on the latter machine, of a group of similar circuits arranged to individually actuate said embossing members, there being a rockable bail for each embossing member conditioned to close the associated circuit, a supporting carrier, means to variously operate said bails and embossing members including a plurality of independent and vertically slidable members supported on said carrier and intermediately arranged between the key-levers and bails, so as to provide one slidable member for each key-lever, and means to separate said slidable members from said key-levers and space the same beyond their limit of movement.

57. In a typewriting machine having key-levers and an embossing machine operatively connected therewith provided with embossing members, the combination of a base for said typewriter having a stationary cross-bar, a plurality of supports arranged thereon, a series of independently movable means arranged on said supports beneath the type-keys and movable by contact engagement therewith, a second series of independently movable means also mounted in said base adjacent said first means and movable by contact thereby, and auxiliary means operable by said first and second means to actuate said embossing members when said type-keys are depressed.

58. In a typewriting machine having key-levers and an embossing machine operatively connected therewith provided with embossing members, the combination of a base for said typewriter having a stationary cross-bar, support means arranged thereon, a series of independently movable means arranged on said support means beneath the type-keys and movable by contact engagement therewith, a second series of independently movable means also mounted in said base adjacent said first means and movable by contact thereby, a third independently movable means beneath said second means to be moved thereby, electric circuits for individually actuating said embossing members, and a switch operable by said third independent means to energize one or more of said circuits when one of said type-keys is depressed.

59. In a typewriting machine having key-levers and an embossing machine operatively connected therewith provided with embossing members, the combination of a base for said typewriter having a stationary cross-bar, support means arranged thereon, a series of independently movable means arranged on said support means beneath the type-keys and movable by contact-engagement therewith, a second series of independently movable means also mounted in said base adjacent said first means and movable by contact thereby, a third independently movable means beneath said second means to be moved thereby, electric circuits for individually actuating said embossing members, individual circuit-closing means associated with said second series of movable members, and a main switch associated with said third movable means for energizing those circuits closed by said second movable means when one of said type-keys is depressed.

60. In a typewriting machine having key-levers and an embossing machine operatively connected therewith provided with embossing members, the combination with a series of independently movable members arranged to control said embossing members, there being a plurality of intermediate members disposed adjacent the key-levers for moving said first movable members, of an electric circuit for rendering effective the actuation of said embossing members by said first movable members, and a switch to close and energize said circuit including stationary contacts, a pivoted contact-member adjacent said stationary contacts, resilient means to normally retain said pivoted contact-member away from the stationary contacts, and means operable by said first independent members to move said pivoted contact-member in opposition to said resilient means to close said circuit when a key-lever is depressed.

61. In a typewriting machine having type-keys and a case-shift-key, and an associated embossing machine for the blind provided with embossing members, means operable by said type-keys for actuating said embossing members including an electric circuit associated with each member, a slidable carriage supporting a shaft movable therewith, a series of depressible bails mounted on said shaft also movable with said carriage and conditioned to individually close said embossing circuits, means to support the carriage, means to transmit movement of said case-shift-key to said carriage to displace the same, and means operable by said bails upon depressing said type-keys for energizing those circuits closed by said bails including a main switch connected to said circuits and a lever for operating said switch disposed adjacent said bails to be moved thereby and slidably mounted on said carriage-shaft, and means to retain said lever in relatively stationary position when the carriage and associated shaft and bails are shifted, and maintain the related operative engagement between said bails and said lever and between the lever and said switch.

62. In a typewriting machine having banks of type-keys and operatively connected with an embossing machine for the blind provided with embossing members, there being means operable by said type-keys including depressible members corresponding with said embossing members for individually controlling the operation thereof in order to emboss multi-point characters equivalent to simultaneously typed characters without distinction between lower-case letters and numerals or upper and lower case letters, the combination with a normal type-key in said banks arranged to depress one of said depressible members whereby to operate the corresponding embossing member and produce and embossed single-point character, and another type-key also in said key-banks arranged to depress a group of said depressible members whereby to operate a corresponding group of embossing members and produce an embossed multi-point character, of a case-shift-key associated with said key-banks and arranged to depress the same single depressible member whereby to operate the same corresponding embossing member and produce the same mentioned single-point character as produced by said first type-key, and an auxiliary key interposed in association with said type-keys and arranged to depress the same group of depressible members whereby to operate the same corresponding group of embossing members and produce the same mentioned multi-point character as produced by the second-mentioned type-key, said character embossed from said shift-key serving as an upper-case prefix, and the character imposed from said auxiliary key serving as a number prefix.

63. In a typewriting machine having type-keys and a shift-key, and an associated embossing machine provided with embossing members, a plurality of parallel circuits for individually actuating said embossing members, there being a depressible bail for each circuit conditioned to close the same, and interposed depressible members between the type-keys and said bails, one of said type-keys being thus conditioned to depress one bail and thereby emboss a point-character corresponding with the typed character, a main switch for energizing said parallel circuits, and means associated with said shift-key to depress the same single bail and emboss the same, one point-character operable by said type-key including a distinct additional movable member operable by said shift-key for engaging and depressing the same bail to close said switch.

64. In a typewriting machine having type-keys and an associated embossing machine for the blind provided with embossing members, means for operating said embossing members from said typewriting machine including a main feeder circuit, a group of parallel secondary circuits individually associated with said embossing members for actuating the same, means for closing all said parallel circuits by connecting all of the same in series with said main circuit, a distinct main switch also operable by the same means for first closing the main circuit and thereafter automatically opening the same while said circuits remain closed in order to transiently actuate the same for operation of all of the associated embossing members, and a normally-closed safety switch also operable in association with said circuit-closing means for opening said main circuit independently of said main switch and conditioned to again close the main circuit, at will, while the main switch remains open and the parallel circuit-closing means remain closed, the latter being operable to finally open said parallel circuits while said main switch remains open and said safety switch remains closed.

65. In a typewriting machine having type-keys and an associated embossing machine for the blind, provided with embossing members, means for operating said embossing members from said typewriting machine including a main feeder circuit, a group of parallel secondary circuits corresponding with said embossing members and individually associated therewith for actuating the same, means for individually closing all of said secondary circuits variously operable by said type-keys in such manner as to connect said circuits in series with the main circuit in order to operate the embossing members associated therewith, means for closing the main circuit including a main switch operable in association with said secondary circuit-closing means, and means for simultaneously operating all of said secondary circuit-closing means and said main switch independently of said type-keys in such manner as to simultaneously operate all of said embossing members and thereafter open said main switch while said secondary circuit-closing means remain closed.

66. In a typewriting machine having type-keys and an associated embossing machine for the blind provided with embossing members, means for operating said embossing members from said typewriting machine including a main feeder circuit, a group of parallel secondary circuits corresponding with said embossing members and individually associated therewith for actuating the same, means for variously closing individual members of said secondary circuits by said type-keys in such manner as to connect said circuits in series with the main circuit in order to operate the embossing members associated therewith, means for closing the main circuit, including a main switch operable with said secondary circuit-closing means, means for simultaneously operating all of said secondary circuit-closing means and said main switch independently of said type-keys in such manner as to simultaneously operate all of said embossing members, and means to open said main switch, so that all of said circuits are transiently energized from said main circuit while said secondary circuits remain closed.

67. In a typewriting machine having type-keys and an associated embossing machine, provided with embossing members, means for operating said embossing machine from said typewriting machine including open parallel electric circuits associated with and corresponding with said embossing members for individually actuating the same, and means for transiently closing said parallel circuits, including a main switch having connections effective by the depression of said type-keys to first close and then automatically open said circuits, said main switch when closed being released by said type-keys before their return to normal position, there being means for selectively closing said open parallel circuits for a momentary flow of current through said main switch.

68. In a typewriting machine having type-keys, a case-shift-key and a shiftable platen and operatively connected with an embossing machine for the blind provided with embossing members, the combination with a plurality of bails corresponding with said embossing members for individually controlling the same, one of said type-keys being arranged to depress one of said bails and control a corresponding embossing member for embossing a single-point character thereby, of means associated with said case-shift-key including an intermediate depressible member having an engagement member for transiently depressing the same bail to operate the same corresponding embossing member and thereby emboss the same single-point character as a prefix to distinguish a following character as a capital, there being also means associated with said case-shift-key to shift said platen to upper-case position.

69. In a typewriting machine having type-keys, a pair of shift-keys and a shiftable platen and operatively connected to an embossing machine for the blind provided with embossing members, the combination with a shiftable carrier and a plurality of bails mounted thereon and corresponding individually with said embossing members for controlling the same without distinction between lower-case and capital letters, one of said type-keys being arranged to depress one of said bails and thereby control a corresponding embossing member for embossing a single-point character, of means associated with one-case-shift-key for depressing said one bail in order to control the same corresponding embossing member and thereby emboss the same single-point character as a prefix to distinguish a following character as a capital, there being independently-mounted intermediate members disposed between all of said keys and said bails, means associated with the other shift-key whereby to shift said carrier and said bails, and means associated with said bails for retaining their respective relation unaltered to said intermediate members for producing unaltered alphabet-characters in shifted position of said carrier, both of said shift-keys being also arranged to individually case-shift said platen.

70. In a typewriting machine having key-banks including a space-bar and operatively connected with an embossing machine for the blind provided with embossing members and letter-space mechanism, said space-bar having two levers, the combination with an electric circuit associated with said letter-space mechanism for actuating the same in order to letter-space said embossing machine, of means operable by one of said space-bar levers for initially closing said circuit, and means operable by the second space-bar lever including a main switch for effectively closing said circuit and thereby operate said letter-space mechanism, said space-bar also simultaneously letter-spacing and feeding said typewriting machine.

71. In a typewriting machine having type-keys and a shift-key, and an associated embossing machine provided with embossing members, means to operate said embossing members from the type-keys, including a rockable lever, independently-mounted means interposed between said keys and said lever to transmit movements of said keys to the lever, an electric circuit associated with each embossing member for actuating the same, and means for simultaneously closing and energizing one or more of said circuits, including a main switch-member associated with said circuits and a pivoted arm relatively disposed to said lever as to be depressible thereby, and arranged to close said main switch upon depression thereof.

ALFRED G. F. KUROWSKI.
CHARLES M. LAWRENCE.